United States Patent

Naito et al.

[11] Patent Number: 6,129,776
[45] Date of Patent: Oct. 10, 2000

[54] OPERATION METHOD OF VERTICAL FURNACE

[75] Inventors: Masaaki Naito; Norimitsu Konno, both of Futtsu; Yasuhiko Fujiwara; Kyoichi Araki, both of Tokai; Teruhiko Kokubun, Kitakami; Tadashi Obara, Kitakami; Yasushi Obara, Kitakami, all of Japan

[73] Assignee: Nippon Steel Corporation, Tokyo, Japan

[21] Appl. No.: 08/913,836

[22] PCT Filed: Jan. 24, 1997

[86] PCT No.: PCT/JP97/00164

§ 371 Date: Sep. 23, 1997

§ 102(e) Date: Sep. 23, 1997

[87] PCT Pub. No.: WO97/27337

PCT Pub. Date: Jul. 31, 1997

[30] Foreign Application Priority Data

Jan. 26, 1996 [JP] Japan ................................. 8-031178
Apr. 17, 1996 [JP] Japan ................................. 8-118238
May 16, 1996 [JP] Japan ................................. 8-144901

[51] Int. Cl.[7] .................................................. C21C 1/04
[52] U.S. Cl. ........................................................... 75/375
[58] Field of Search .............................. 75/500, 487, 375, 75/384, 385, 387

[56] References Cited

U.S. PATENT DOCUMENTS 4,857,106   8/1989   Wakimoto et al. ...................... 75/500

FOREIGN PATENT DOCUMENTS 1-501401    5/1989   Japan .
1-290711   11/1989   Japan .
4-80312     3/1992   Japan .
08199213    8/1996   Japan .
1082160     9/1967   United Kingdom .

OTHER PUBLICATIONS

Patent Abstracts of Japan, vol. 005, No. 195 (C–083), Dec. 11, 1981 & JP 56 119710 A (Kawasaki Steel Corp), Sep. 19, 1981.
Patent Abstracts of Japan, vol. 011, No. 185 (C–428), Jun. 13, 1987 & JP 62 010203 A (Kawasaki Steel Corp), Jan. 19, 1987.
Patent Abstract of Japan, vol. 013, No. 399 (C–632), Sep. 5, 1989 & JP 01 142006 A (NKK Corp), Jun. 2, 1989.
Oeters F et al: "Entwicklungslinien der Schmelzreduktion" Stahl und Eisen, No. 16, Aug. 14, 1989, pp. 728–742.
Transactions of the American Foundarymen's Society, vol. 85, pp. 327–332, Dec. 1997.

*Primary Examiner*—Scott Kastler
*Attorney, Agent, or Firm*—Kenyon & Kenyon

[57] ABSTRACT

A method for operating a shaft furnace which comprises charging the furnace with an iron source having a low degree of metallization and thus requiring reduction, an iron source having a high degree of metallization and thus requiring nothing but melting, and a solid fuel, and blowing an oxygen-containing gas at ordinary or higher temperature up to 600° C. into the furnace through tuyeres to reduce and melt the iron sources. The optimal values of ηco (gas utilization factor) are determined from the average degree of metallization of the iron sources, and the shaft furnace is controlled so that the effluent gas from the furnace has the optimal ηco values. The control is accomplished by regulating the height of the charge, regulating the height of the coke bed, etc., using multistage tuyeres, and radially partitioning the charge. Thus, the iron sources can be efficiently reduced and melted at a low fuel ratio.

9 Claims, 11 Drawing Sheets

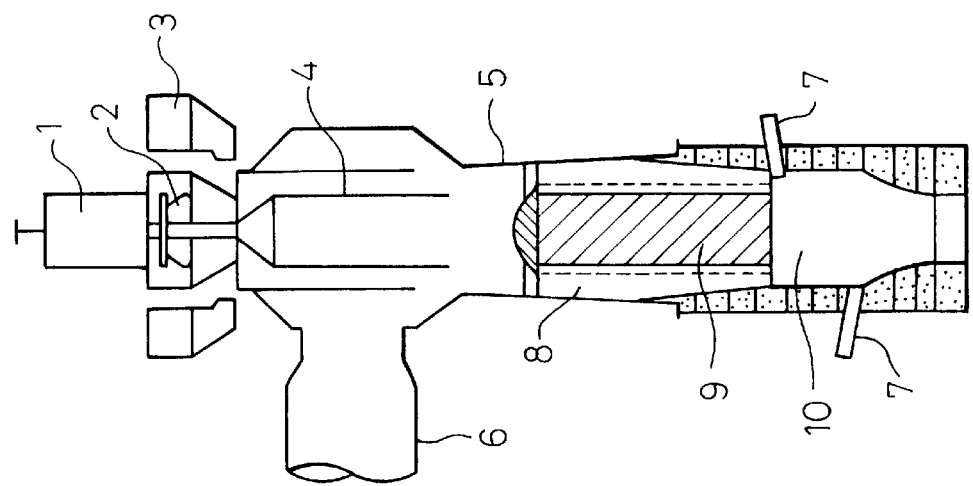
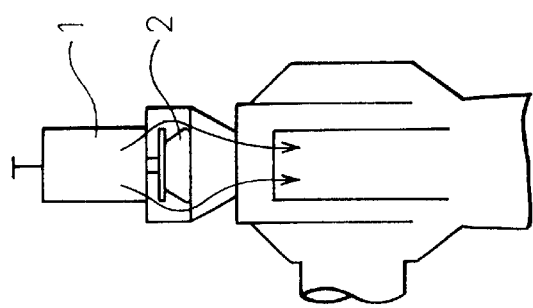
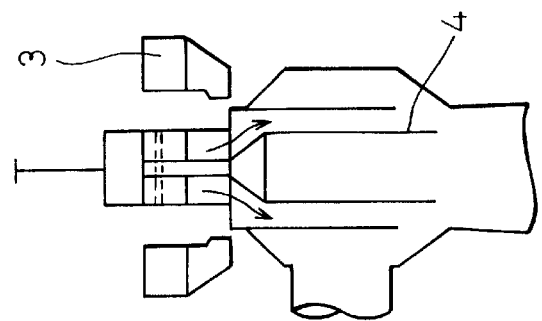

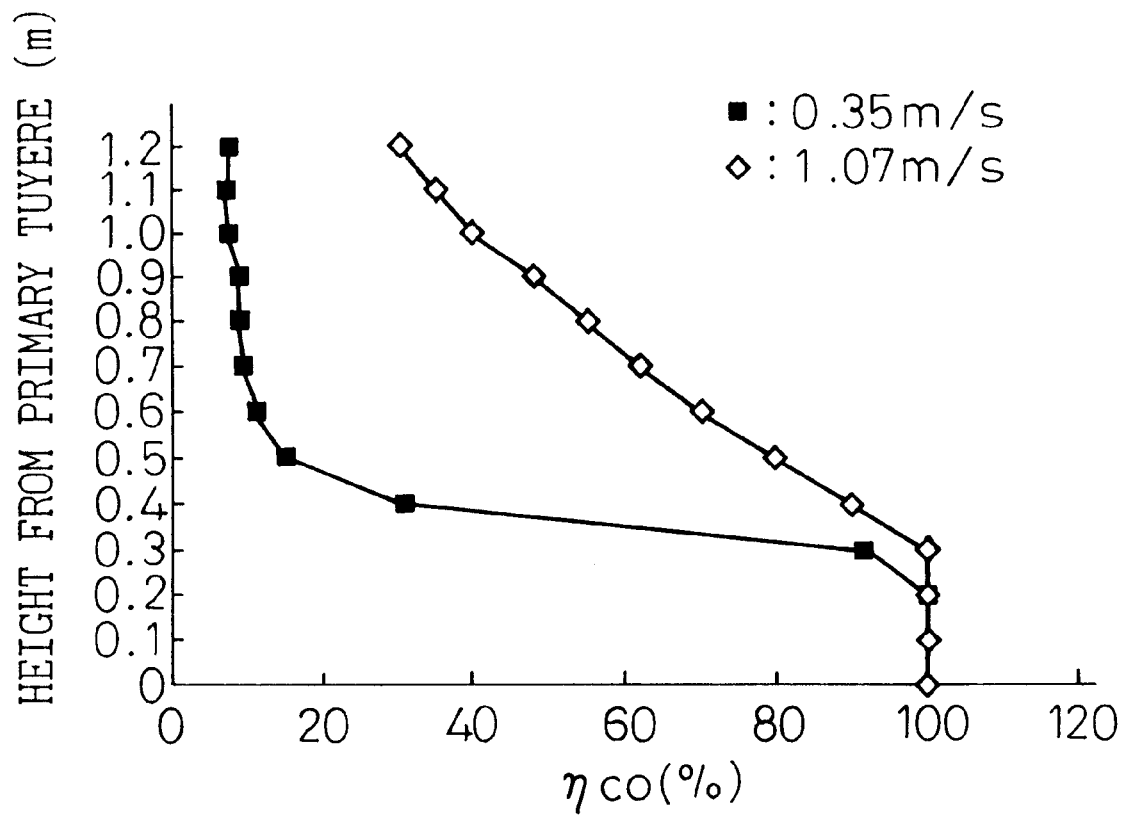

Fig.7(a)

| FURNACE WALL | |
|---|---|
| SMALL SIZE COKES<br>SELF REDUCED LAMP ORE<br>DUST PELLET<br>REDUCED IRON | (PERIPHERAL PORTION) |
| LARGE SIZE COKES<br>IRON SCRAP<br>PIG IRON | (CENTER PORTION) |
| SMALL SIZE COKES<br>SELF REDUCED LAMP ORE<br>DUST PELLET<br>REDUCED IRON | (PERIPHERAL PORTION) |
| FURNACE WALL | |

Fig.7(b)

| FURNACE WALL | |
|---|---|
| SMALL SIZE COKES<br>DUST PELLET | (PERIPHERAL PORTION) |
| LARGE SIZE COKES<br>IRON SCRAP | (CENTER PORTION) |
| SMALL SIZE COKES<br>DUST PELLET | (PERIPHERAL PORTION) |
| FURNACE WALL | |

Fig.7(c)

| FURNACE WALL | |
|---|---|
| SMALL SIZE COKES<br>SELF REDUCED LAMP ORE<br>DUST PELLET | (PERIPHERAL PORTION) |
| REDUCED IRON<br>LARGE SIZE COKES<br>IRON SCRAP | (CENTER PORTION) |
| SMALL SIZE COKES<br>SELF REDUCED LAMP ORE<br>DUST PELLET | (PERIPHERAL PORTION) |
| FURNACE WALL | |

Fig.7(d)

| FURNACE WALL | |
|---|---|
| SMALL SIZE COKES | |
| SELF REDUCED LAMP ORE<br>DUST PELLET<br>REDUCED IRON<br>SMALL SIZE COKES | (PERIPHERAL PORTION) |
| LARGE SIZE COKES<br>SMALL SIZE COKES<br>IRON SCRAP | (CENTER PORTION) |
| SELF REDUCED LAMP ORE<br>DUST PELLET<br>REDUCED IRON<br>SMALL SIZE COKES | (PERIPHERAL PORTION) |
| SMALL SIZE COKES | |
| FURNACE WALL | |

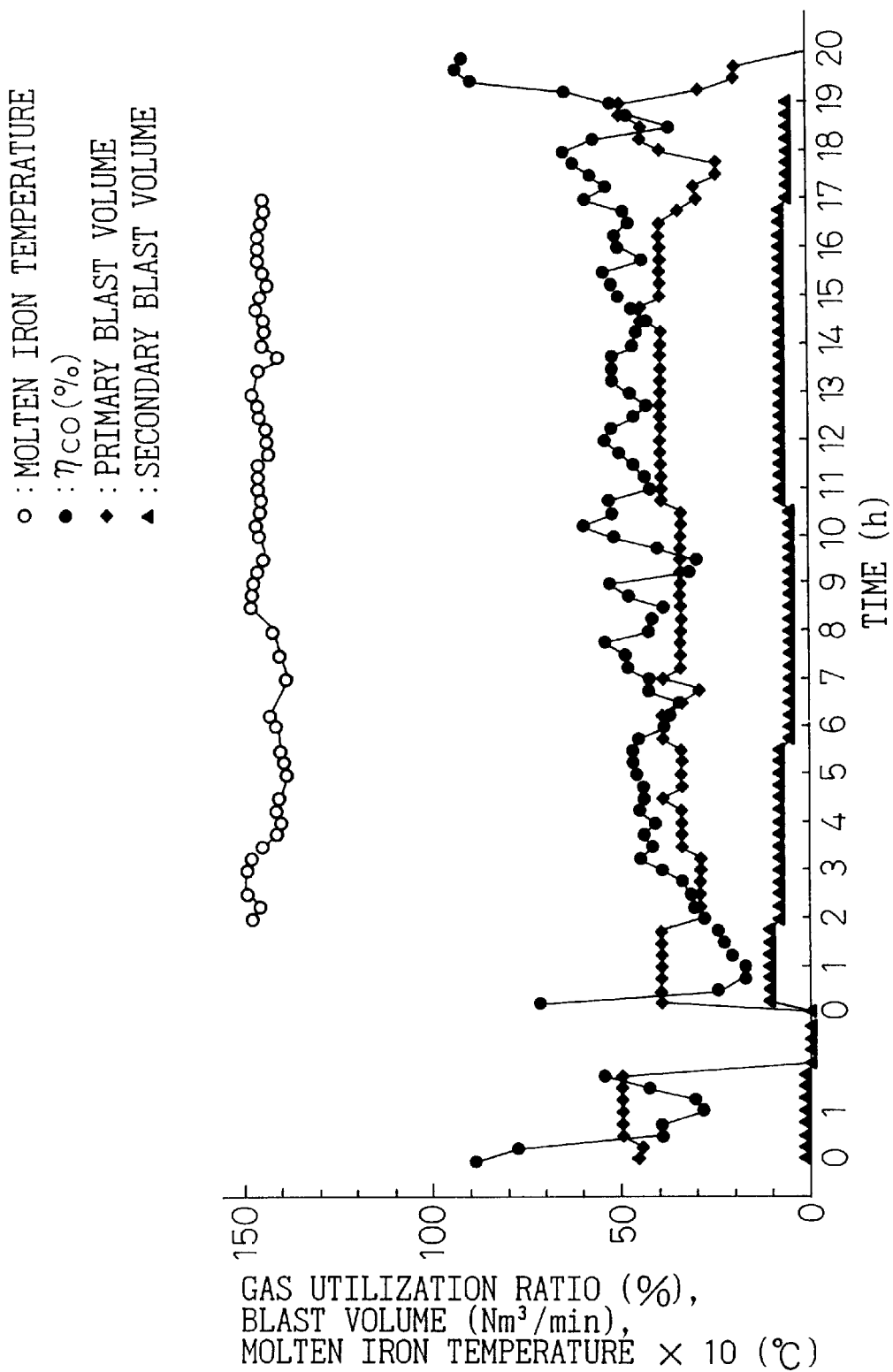

OPERATION METHOD OF VERTICAL FURNACE

TECHNICAL FIELD

This invention relates to a raw fuel charging method to a vertical furnace which can continuously melt a pig iron with high heat efficiency and at a low material and fuel rate irrespective of properties of a solid fuel by using an iron-containing dust and/or iron scraps and/or a reduced iron having a small impurity content as an iron source, and also to an operation method of the vertical furnace.

BACKGROUND ART

Various methods of producing a pig iron from an unreduced ore have been developed to this date, and a blast furnace method has been mainly employed at present. According to this blast furnace method, a raw material charged from the furnace top is sufficiently pre-heated by a high temperature gas flowing from below to above while the raw material falls, and iron oxide is indirectly reduced by a carbon monoxide (CO) at a ratio of at least 60%. To secure such an indirect reduction ratio in the blast furnace method, a raceway space is disposed in front of a tuyere, and a reducing gas of $\eta co$ $(=CO_2/(CO+CO_2))=0$ is produced. To raise the temperature of the combustion gas serving as the high temperature gas described above, a blast temperature is set to a temperature of not less than 1,000° C.

In a melting furnace using the iron source such as the iron-containing dust and/or the iron scrap as the principal material, however, the necessity for producing the reducing gas at the tuyere portion becomes lower. It is therefore believed efficient to utilize the combustion of a coke in front of the tuyere as means for securing the heat source for heating the changing material melting iron source.

In the case of the cupola method, for example, which is mainly directed to melt the iron source such as the iron scrap, the casting scrap, the pig iron, etc, but does not require the reducing function, the raw material and fuels are generally charged in mixture and melting of the iron source is generally carried out under the condition of $\eta co$ (gas utilization ratio)=40 to 50%. To accomplish such a gas composition, the cupola method uses a casting-coke which has a particle size of 100 to 150 mm, and prevents the solution loss reaction after the combustion of the coke. Because the large diameter coke for casting is expensive, however, it is believed effective to use a coke having a smaller particle diameter so as to reduce the fuel cost. In this case, however, the solution loss reaction rate as the endothermic reaction becomes greater and gas utilization ratio $\eta co$ of the coke drops, so that the melting calory drops and a stable operation becomes difficult to practice.

On the other hand, there are not many operation examples of a vertical furnace which use a self-reducible lump ore and the iron scrap as the main raw materials and requires the reducing function up to melting. Unlike the blast furnace, the raceway is not disposed in such a vertical furnace, and the operation is carried out by setting the blast temperature to not higher than 600° C.

Goksel et al (Transactions of the American Foundrymen's Society, Vol. 85, AFS Des Plaines, III, (1977), pp. 327–332) report the experiment of a hot blast cupola using 5 wt % of a C-containing pellet at a blast temperature of 450° C., but no prior art references have been found which deal with the operation of the normal temperature blast cupola or the operation of the vertical furnace when a large quantity of the C-containing pellet is used.

Japanese Unexamined Patent Publication (Kokai) No. 1-501401 discloses a pig iron producing apparatus comprising a blast furnace having a secondary tuyere and a hearth having a diameter more than that of the blast furnace and having a primary tuyere. According to this furnace, only the iron source is charged from the furnace top, and the fuel is directly added to the fuel bed existing at the junction between the blast furnace and the hearth. Therefore, because the inside of the blast furnace is an ore layer in which the fuel does not exist, the solution loss reaction due to the solid fuel does not proceed, and high efficient operation can be expected with an exhaust gas composition having a high $CO_2/(CO+CO_2)$ value. In this furnace, the self-reducible ore as the main material undergoes the reaction with the coke inside the coke bed at the hearth, and the melt reduction as the exothermic reaction occurs. However, because the endothermic reaction reexpressed by the following formula (2) occurs at the secondary tuyere portion, this heat is used for pre-heating, heating or melting of the iron source and the pig iron can be presumably obtained:

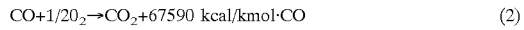

$$CO+1/2O_2 \rightarrow CO_2+67590 \text{ kcal/kmol·CO} \quad (2)$$

Since the fuel is not charged from the furnace top of the blast furnace but only the ore is charged, the coke inside the coke bed is consumed undesirably by carburizing the iron with the passage of the operation time when the continuous operation is carried out for a long time. As is obvious from the Fe—C—O equilibrium diagram, gas reduction from FeO to Fe does not easily proceed even in the self-reducible ore containing C when a gas composition has a high degree of oxidation of $\eta co \geq 30\%$ and a temperature is not lower than 1,000° C. In consequence, melt reduction at the furnace lower portion becomes unavoidable, and the increase of the coke consumption quantity, the drop of the furnace heat or increase of blast pressure due to the increase of the molten liquid quantity are likely to develop. Further, when being softened and meted in the high temperature zone, the ore comes into contact with the furnace wall and turns into the adhesion, thereby resulting in so-called "shelving".

In addition to the problems described above, the shape of the furnace becomes complicated, and the problem of cooling the furnace body occurs at the time of scale-up. Therefore, a large scale furnace is believed difficult to implement.

On the other hand, Japanese Unexamined Patent Publication (Kokai) No. 1-501401 described above does not concretely clarify the corelationship between the position of addition when the fuel is added from the junction portion between the blast furnace and the hearth and the primary tuyere. The primary tuyere is shown disposed between the adjacent fuel addition positions.

If the primary tuyere exists at the middle position between the adjacent fuel addition positions as described above in a furnace having a hearth mean diameter $D \geq 1.00$ m, supplementation of the coke burnt at the primary tuyere portion is effected by the charge existing immediately above it. In this case, therefore, the ore falling from the upper part of the furnace replaces the burnt coke, and the fuel added is not believed to smoothly lower, so that the possibility of the operation stop is great.

DISCLOSURE OF INVENTION

In the melting furnace operation for the iron source according to the prior art, the use of the expensive large diameter coke has been unavoidable. In contrast, Japanese Unexamined Patent Publication (Kokai) No. 1-501401 devises a melting furnace having a complicated furnace body structure, and proposes a technology directed to accomplish high gas utilization ratio ηco and to reduce the fuel rate when the small diameter coke and large quantities of self-reducible lump ore are used. However, the problems that so-called "shelving" is likely to occur inside the furnace and the coke bed at the lower part of the furnace is consumed are yet left unsolved, and these problems hinder the stable operation of the furnace for a long time. Further, the problem of installation at the time of scale-up still remains.

When the use of large quantities of small particle solid fuel is assumed as the premise, the long term stable operation directed to the low fuel rate has been believed difficult according to the prior art which melts the self-reducible ore lump, the iron scrap, and so forth.

It is the technical problem of the present invention to make it possible to efficiently carry out the furnace operation without lowering gas utilization ratio ηco of the solid fuel and while avoiding so-called "shelving" even when a solid fuel having a smaller particle size than the casting coke is used.

In an operation method which charges at least one iron source selected from those iron sources which do not require a reducing function such as dust lump ore, a self-reducible lump ore (C-containing lump ore), reduced iron having a low metallization ratio (inclusive of reduced iron powder), etc, and those which require only a melting function such as HBI, DRI, an iron scrap, a mold pig iron, a return scrap, etc, and a solid fuel, into a vertical furnace, and which reduces and melts the iron source by blasting an oxygen-containing gas at a temperature from a normal temperature to a temperature not higher than 600° C. from a tuyere provided to a wall surface of the vertical furnace, the present invention can use a solid fuel having a small particle size, controls ηco=($CO_2/(CO+CO_2)$) as an index of reaction and heat efficiency inside the furnace in accordance with the kind of the iron source, and reduces and melts efficiently the iron source at a low fuel rate.

The operation method of the vertical furnace according to the present invention which charges at least one iron source selected from those iron sources which require a reducing function such as a dust lump ore, a self-reducible lump ore (C-containing lump ore), reduced iron having a low metallization ratio (inclusive of reduced iron powder), etc, and those which require only a melting function such as HBI (hot briquette reduced iron), DRI (reduction from produced by direct reduction), an iron scrap, a mold pig iron, a return scrap, etc, and a solid fuel into the vertical furnace, has the gist thereof in the following points.

As the method of controlling gas utilization ratio ηco inside the furnace, the present invention employs the following means:
  to adjust the charge height (stock level) of the charge comprising the iron source and the solid fuel inside the vertical furnace;
  to adjust at least one of the height of the coke bed, the blast quantity, the tuyere diameter and the tuyere protruding position in accordance with the particle size of the solid fuel; and
  to provide two or more stages of tuyere in the direction of the height of the furnace, and to adjust the blasting ratio of each tuyere disposed in the direction of the height in accordance with a mean metallization ratio of the iron source.

In the charging method, two charges and the more constitute one cycle, the weight ratio of the iron source/solid fuel and/or the kind of the iron source and/or the particle size of the solid fuel is changed for each charge in each cycle, and the same charge is repeated in the cycle unit so as to control the ηco value to the value most suitable for the reduction/melting of the iron source described above.

When the iron source and the solid fuel are charged into the furnace from the upper part of the furnace, the iron source having a high metallization ratio is mixed with the solid fuel and charged into the furnace center portion of the vertical furnace, while the iron source having a low metallization ratio is mixed with the solid fuel and charged into the furnace peripheral portion of the vertical furnace. In this instance, the height of the coke bed at the lower part of the vertical furnace is adjusted to a predetermined height in accordance with the particle size of the solid fuel comprising the coke, which is to be charged into the vertical furnace, and with the blasting condition from the tuyere.

Further, the particle size of the solid fuel charged into the furnace peripheral portion of the vertical furnace is limited to not more than 60 mm, whereas the particle size of the solid fuel to be charged into the furnace center portion is set to be more than the particle size of the charge to be charged into the peripheral portion, preferably at least 60 mm. Further, when the solid fuel and the iron source are mixed and charged into the furnace center portion of the vertical furnace, the weight ratio of C contained in the solid fuel to Fe contained in the iron source is limited to 0.01 to 0.05.

Furthermore, the charging height of the charge comprising the iron source and the solid fuel to be charged into the furnace peripheral portion of the vertical furnace with respect to the furnace center portion (stock level) is changed in accordance with a mean metallization ratio of the iron source.

BRIEF DESCRIPTION OF DRAWINGS

FIG. 1(a) shows a view illustrating an example of a reaction apparatus and a charging apparatus, FIG. 1(b) shows a charge into a furnace center portion, and FIG. 1(c) shows a charge into a furnace peripheral portion.

FIG. 4(c) shows the same relationship when the gas flow rate in a furnace is variable.

FIG. 7(a)–(d) are views illustrating typical examples of the charging method.

FIG. 9 shows another example of an operation data.

BEST MODE FOR CARRYING OUT THE INVENTION

Figure 2C:
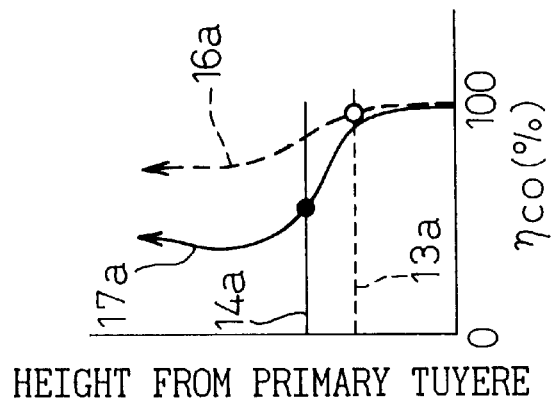
FIG. 2(c) shows an explanatory view of the relationship in the FIG. 2(a) at center and peripheral portion.

First, an apparatus and a method of an operation according to the present invention will be explained.

The reaction apparatus of the present invention is shown in FIGS. 1(a) to 1(c). FIGS. 1(b) and 1(c) show a top portion of the charging apparatus shown in FIG. 1(a). The charging apparatus comprises a bucket 1, a bell 2, a movable armor 3 and a charging guide 4, and a discharge gas pipe 6 is disposed at top portion of a furnace body 5, and at bottom portion a tuyere 7 is disposed. A charge can be dividedly charged at a center portion 9 and a peripheral portion 8. Moreover, a coke bed 10 can be formed at bottom portion to adjust a height thereof.

The reaction apparatus has at least two stages of tuyeres in the direction of height, and a charging machine capable of divided charging in a radial direction is provided to the furnace top (see FIG. 1). Blasting is normal temperature blasting or hot blasting at a temperature not higher than 600° C., and as to the tuyere diameter, the tuyere diameter is set so as not to generate a lathe-way in consideration of oxygen enrichment. The protruding position of the secondary tuyere is changed in accordance with the raw materials charged.

The raw materials are mainly those iron sources which have a high metallization ratio such as the iron scrap, the pig iron, the casting scrap, the hot briquette iron (HBI), the reduced iron DRI, etc., and those which have a low metallization ratio such as the dust lump ore, the self-reducible lump ore, the oxidized reduced iron lump ore, ore powder, etc., and the fuel is mainly a solid fuel such as the coke, the smokeless coal, and so forth.

An ordinary charging method which charges the coke so as to form the coke bed layer and then charges the raw fuel either fully or as a mixture or in the laminar form and a novel charging method which dividedly charges the raw fuel in the radial direction are employed as the charging method.

Figure 2B:
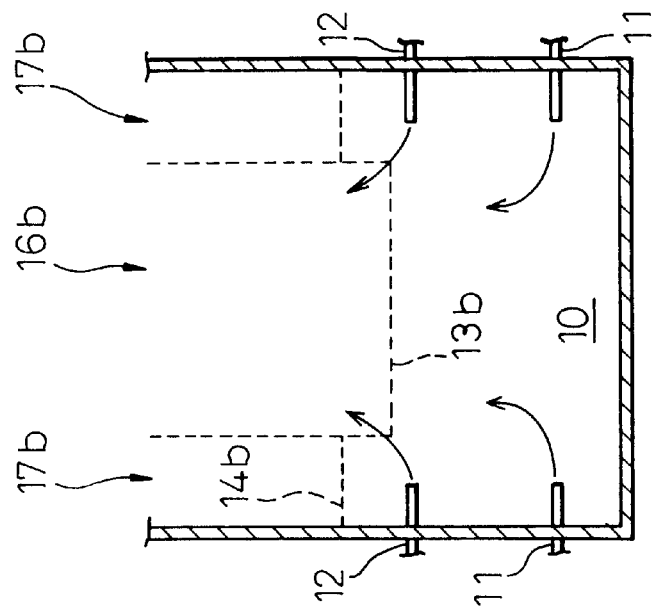
FIG. 2(b) shows a charging method of small mean metallization ratio.
Figure 2A:
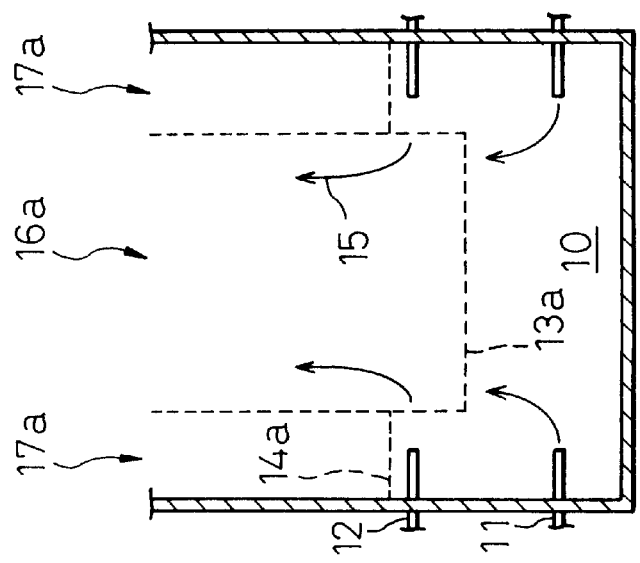
FIG. 2(a) shows a charging method of large mean metallization ratio.

FIG. 2(a) shows a charge in which only kinds of the iron source are melted in the center portion 16a, coke plus the kinds of the dust are in the peripheral portion 17a, and the heights of the coke bed 10 are 13a in the center portion 16 and 14a in the peripheral portion. FIG. 2(6) shows a charge in which the coke, iron source and dust are in the center portion 16, the cokes plus kinds of dust are in the peripheral portion 17b, and the heights of the coke bed 10 are 13b in the center portion and 14b in the peripheral portion. In these figures, gasses such as oxygen are provided from the primary tuyere 11 and secondary tuyere 12, gas flow 15 in the furnace is formed and reduces/melts the raw material.

FIG. 2(c) shows a relationship between gas utilization ratio inside a furnace ηco and the distance from the primary tuyere at the center portion and the peripheral portion in FIG. 2(a).

The novel charging method can be broadly divided into a method which is directed to an operation having high reaction efficiency and a method directed to use large quantities of fine granular iron sources. The former method divides the charged raw materials in accordance with a mean metallization ratio obtained by weighted mean of the metallization ratio of each of the raw materials charged, and charges the raw materials having a high mean metallization ratio to the center side and the raw materials having a low mean metallization ratio to the peripheral side while mixing them with the fine granular coke so as to attain the operation having high reaction efficiency. This method is depicted in FIGS. 2(a) and 2(b). The latter method mixes the fine granular (−5 mm) iron source with the fine granular solid fuel, and charges this mixture to the peripheral side and the iron source having a large particle size to the center side so as to attain the use of large quantities of the fine granular iron source under the condition where the gas flow is stabilized.

The operation of the reaction furnace is controlled by adjusting the coke bed height and the stock level position and by employing the divided charging method and changing the protruding position of the secondary tuyere in accordance with the kind of the raw material and fuel used. The optimal height of the coke bed varies depending on whether the operation is mainly directed to melting of the iron source or to reduction of the iron source, and the upper end position of the coke bed is set at the position corresponding to the target ηco. By the way, the combustion reaction of the coke and the solution loss reaction after combustion proceed inside the coke bed, and the reaction rates of both of the reactions are adjusted by the particle size of the solid fuel, the gas flow velocity and the blast temperature.

The stock level position is associated with the temperature rise rate of the raw fuel, and particularly affects the solution loss reaction rate of the solid fuel. Therefore, the stock level position is used as control means for not lowering reaction efficiency. As to the divided charging method in the radial direction, the interior of the reaction apparatus is divided into the portion at which the metallization ratio is high and the portion at which it is low. The former is used for the operation mainly directed to melting and the upper limit of the gas utilization ratio ηco is aimed as the target. The latter is mainly directed to reduction. The operation having the highest efficiency ratio can be attained as a whole by controlling the utilization ratio necessary for the reduction in accordance with the mean metallization ratio of the raw materials and with the C content. The secondary tuyere is effectively used for the portion where the metallization ratio is high and melting is of importance, and the upper limit of the secondary combustion ratio is aimed by secondary blasting. When the portion where melting is of importance is set closer to the center side in the divided charging method in the radial direction, the highest effect can be obtained by setting the protruding position of the secondary tuyere at the boundary position between the center and the periphery of the furnace.

Next, the method of controlling the gas utilization ratio ηco will be explained. An example of the ηco control method according to the present invention involves the following steps. The gist of the ηco control flow in a furnace of the present invention will be explained. The present control of ηco can be summarized as the following ① to ⑤:

① The mean metallization ratio (mean M.Fe/T.Fe) is determined from the components and the blend amounts (amounts used) of the charged iron source.

When a more efficient operation is intended, a divided charge in a radial direction is executed, in a case of applying this charging method, a mean metallization ratio is calculated in the iron source charged into a center portion and peripheral portion, respectively.

② The range of the ηco level suitable for the operation is stipulated from the mean metallization ratio (mean M.Fe/T.F) of this charged iron source and from the C content of the iron source in accordance with the formula (1) (FIG. 3):

In a case of the divided charging method, a suitable ηco is determined in the center portion and peripheral portions, respectively, $$1.5 \times C\ \% \leq \eta co - 0.7 \times (\text{mean M.Fe/T.Fe}) \leq 3.0 \times C\ \% \quad (1)$$

where:

C: C content contained in iron source, $0\% \leq C\ \% \leq 20\%$, $\eta co$: gas utilization ratio (%)

(mean M.Fe/T.Fe): mean metallization ratio (%)

metallization ratio: metallic iron in iron source (M.Fe)/total iron in iron source (T.Fe)

mean metallization ratio: metallization ratio obtained by weighted mean of several kinds of the iron source ③ Since the mean gas flow velocity (N m/s) inside the furnace is determined by the operating condition (criterion of tapping quantity) of the melting furnace, the height of the coke bed from the primary tuyere is determined in accordance with the particle size of the solid fuel used from the data shown in FIG. 4.

In a case of the divided charging method, the suitable coke bed height is determined in the central portion and peripheral portion, respectively.

Figure 5:
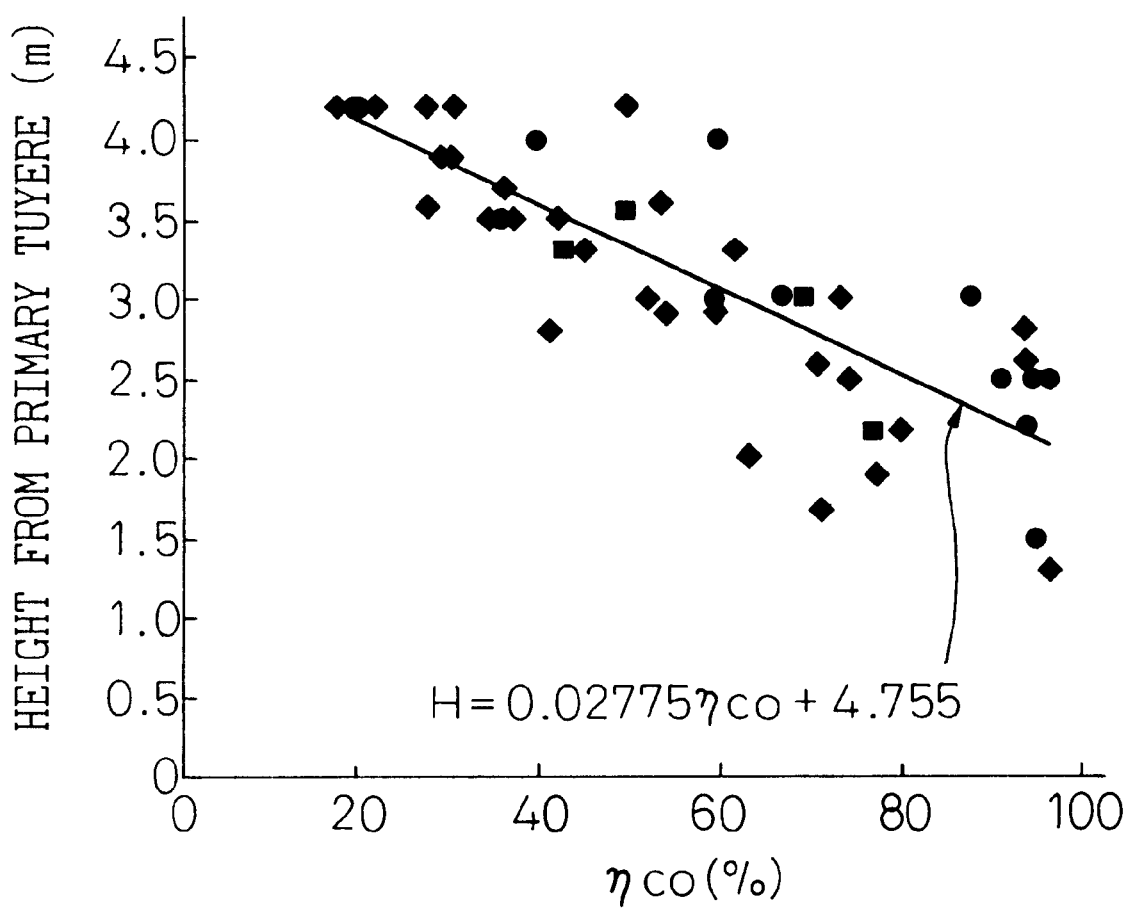
FIG. 5 shows a view illustrating the relationship between a stock level and ηco.

④ In connection with the stock level, the stock level (height of the charge surface from the primary tuyere) H (m) corresponding to the target $\eta co$ is stipulated and set in accordance with the formula (3) (FIG. 5).

The approximate expression (3) is an approximate line by the method of least squares, and presumably varies to some extents depending on the kind of the iron source and on the metallization ratio. However, the stock level H (m) is set on the basis of the target $\eta co$.

$$H = -0.02775 \eta co + 4.755 \quad (3)$$

In a case of the divided charging method, the stock level is preferably determined in the central portion and peripheral portion, respectively.

⑤ As to the fuel ratio, the fuel ratio (kg/t) level can be determined from the heat-material balance once the target $\eta co$ described above is determined, in addition to the furnace body heat radiation (kcal/hr) as the characteristics of the furnace, the target tapping quantity (t/d) and the operation conditions inclusive of the kind of the iron source, quality, etc. Eventually, the operation is carried out in such a manner as to keep the target $\eta co$ level by executing fine adjustment of the secondary blast volume and fine adjustment of the stock level.

In a case of the divided charging method, the fuel ratio is determined and charged in the central portion and peripheral portion, respectively.

The reason why $\eta co$ inside a furnace must be adjusted and controlled in accordance with a mean metallization ratio (M.Fe/T.Fe) of iron contained in an iron source when the iron source is reduced and melted will be explained.

The reduction function is not required in a melting operation of iron sources having a high metallization ratio of at least 90% such as the iron scrap, the pig iron, the casting scrap, HBI, the reduced iron DRI, etc. Therefore, the condition having high $\eta co$ is preferred so as to accomplish the low fuel rate operation, and the value $\eta co > 80\%$ is the target of the operation.

When the iron sources having a low metallization ratio such as the dust lump ore, the self-reducible lump ore, partially oxidized reduced iron, the reduced iron powder, etc, are reduced and molten, on the other hand, it is preferred to allow the reduction by the solid-gas reaction, to produce large quantities of solid iron and then to melt it in order to stabilize the operation and to improve quality of the pig iron. To accomplish this object, a gas condition of $\eta co <$ approx. 30% is necessary in the temperature range of at least 1,000° C., for example, as the thermodynamic condition (from the theory of equilibrium) for reducing pure wustite (FeO) to iron.

The iron sources requiring such a condition are wustite (FeO) having a metallization ratio of 0%, the sinter, the pellet, the lump ores as the charge of the blast furnace, and so forth.

It has been confirmed, on the other hand, that in the case of C-containing lump ores such as the C-containing self-reducible lump ore used in the present invention or the C-containing dust lump ore, for example, the condition of $\eta co <$ approx. 30% can be established inside the lump ore due to the existence of C inside the lump ore and the reduction to the reduced iron proceeds even under the condition where the gas atmosphere outside the lump ore is $\eta co >$ approx. 30% and the reduction from FeO to the iron does not proceed from the principle of the theory of equilibrium.

In the operation of 50% of the self-reducible lump ore containing 12% of C and 50% of the iron scraps, for example, the operation smoothly proceeds even under the gas condition of the furnace top $\eta co =$ about 50%, and this suggests that the reduction appropriately proceeds inside the furnace.

As described above, high $\eta co$ cannot be expected under the condition where large quantities of the dusts having a low metallization ratio are used as in the case where the reducing process of the iron source is of importance, but in the case of the melting operation of the iron scraps mainly directed to melting of the iron source or the operation using large quantities of the iron sources having a high metallization ratio, or the operation using a small quantity of the dust having a low is metallization ratio, a high $\eta co$ operation can be contemplated.

In other words, it is preferred to manage and control the $\eta co$ level within the range where no problem occurs in the reducing reaction, in accordance with the kind of the iron source and with the proportion of M.Fe/T.Fe.

Next, the method of controlling $\eta co$ will be described.

As the method of controlling $\eta co$, the present invention proposes ① to control the charging height position of the charge (stock level), ② to control the height of the coke bed, etc, ③ to use a multi-stage tuyere, and ④ to divide the charge in a radial direction. Hereinafter, these technologies will be serially explained.

First, that the change of the charge height (stock level) of the charge consisting of the iron source and the solid fuel inside the vertical furnace is effective for controlling $\eta co$ will be explained.

As to the stock level, the ratio H/D of the height (H) from the lower stage tuyere to the stock level to the furnace diameter (D) is generally set to 4 to 5 in the cupola operation for melting the iron scrap, the casting scrap, etc, by using the large diameter casting coke, for example. As to the vertical furnace using the small diameter coke such as the blast furnace coke and requiring the reducing function such as dust reduction, however, the examination results about the stock level have not been found out. Therefore, the stock level changing test is carried out under the condition where large quantities of the iron scrap are used, and the relation with the exhaust gas $\eta co$ is sorted out and shown in FIG. 5.

The result of the experiment using a vertical furnace having a hearth diameter of D=1.4 m reveals that when H/D is set to a small ratio of H/D=2.0, a high exhaust gas $\eta co$ of $\eta co > 70\%$ can be kept, and the exhaust gas $\eta co$ can be lowered by raising the stock level.

For, when the stock level is raised, heat transfer from the gas to the raw material and fuel becomes excellent, and pre-heating and temperature rise of the solid fuel proceed from a higher portion, so that the solution loss reaction of the formula (4) expands to the upper part of the furnace. As a result, the consumption quantity of C becomes great and ηco drops.

$$C + CO_2 = 2CO \qquad (4)$$

As described above, the change of the stock level plays the role of controlling the temperature rise rate of the raw material and fuel inside the furnace, and serves as control means for the exhaust gas ηco.

Next, that the change of the coke bed height at the lower part of the vertical furnace, and that the change of the blast volume, the tuyere diameter and the change of the protruding position of the tuyere are effective for controlling ηco will be explained.

Figure 4A:
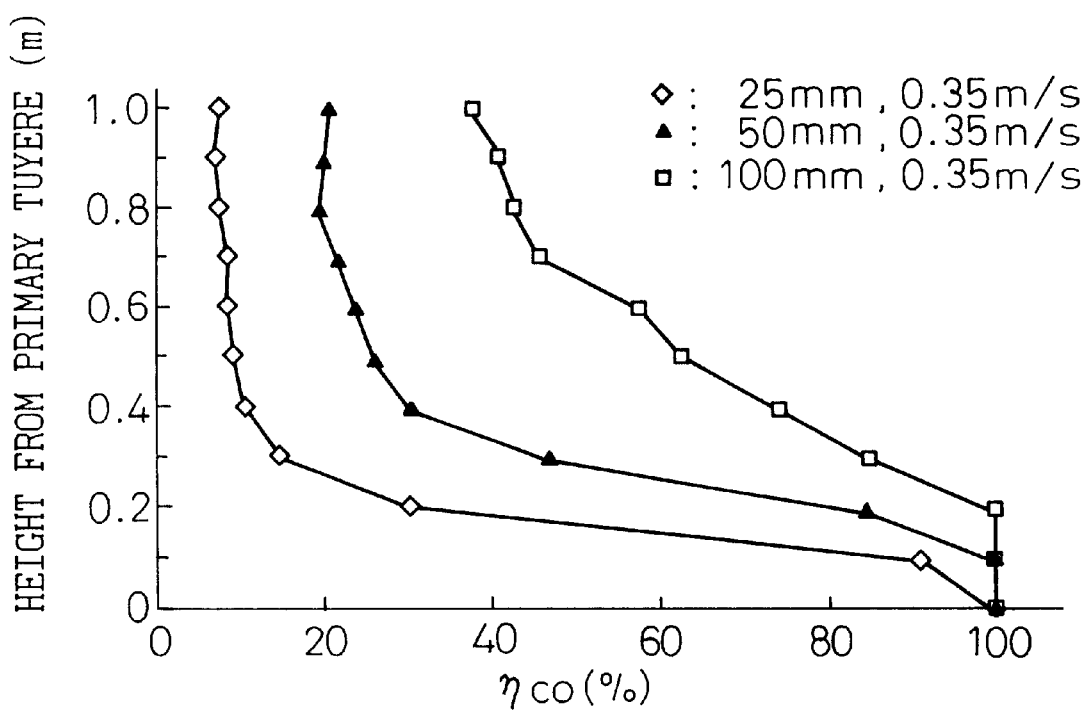
FIG. 4(a) shows a view illustrating the relationship between a coke bed height and ηco when the coke particle size is variable at gas flow rate in a furnace: 0.35 Nm/s.
Figure 4B:
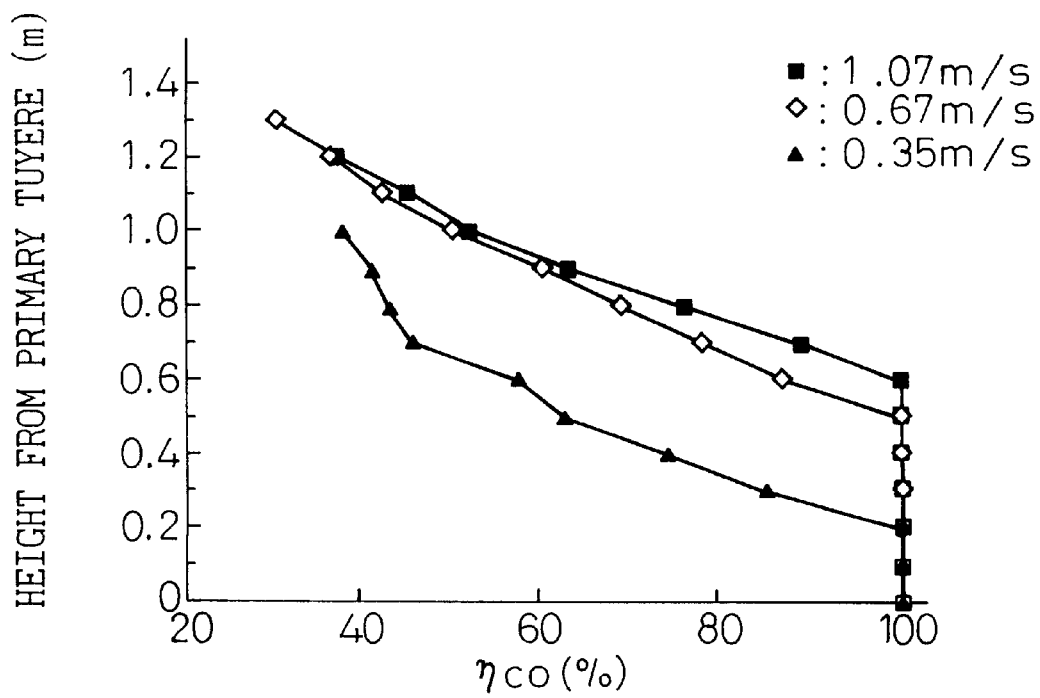
FIG. 4(b) shows the same relationship at the coke particle size: 30 mm.

FIGS. 4(a)–4(c) show the experimental result of the off-line simulator for investigating the coke bed height from the tuyere and the shift of ηco at that portion by changing the coke particle size and the blast volume (gas flow velocity). According to FIGS. 4(a)–4(c), oxygen and enriched oxygen in air blasted from the tuyere are burnt with the coke and form $CO_2$, and reach complete combustion at the portion at which $O_2$ disappears, in accordance with the following formula (5):

$$C + O_2 \rightarrow CO_2 \qquad (5)$$

The gas temperature is the highest at this portion, and the solution loss reaction of the formula (5) as the endothermic reaction proceeds above this portion, so that ηco drops and the gas temperature drops, too.

When the coke particle size becomes smaller, the combustion rate of the formula (5) becomes faster. Therefore, the portion having the highest gas temperature ($O_2$=0 and ηco= 100%) becomes closer to the tuyere. When the blast volume is increased and the gas flow velocity is raised, the flow velocity of oxygen inside the furnace blown from the tuyere rises and its contact time with C in the proximity of the tuyere becomes shorter. In consequence, the combustion reaction of the formula (5) expands to the upper part of the furnace. Therefore, when the flow velocity is increased at the same coke particle size, ηco inside the furnace becomes higher as a whole than when the flow velocity is low, as can be seen from FIGS. 4(a)–4(c). The arrangement in which the primary tuyere is allowed to protrude into the furnace or the diameter of the tuyere is contracted to elevate the tuyere flow velocity corresponds to shortening of the contact between blast oxygen and C, and provides the similar effect to the elevation of the flow velocity inside the furnace. In this way, the change of the coke bed height at the lower part of the vertical furnace, and the changes of the blast volume, the tuyere diameter and the tuyere protruding position, are effective means for controlling ηco inside the furnace.

Next, the reasons why the divided charging method of the charge in the radial direction is the effective means for controlling ηco without lowering combustion efficiency of the vertical furnace even when the small diameter solid fuel is used, and why the disposition of a plurality of multi-stage tuyeres on the wall of the shaft portion of the vertical furnace in the longitudinal direction are more effective for controlling ηco will be explained.

The solid fuel burns at the primary tuyere portion in accordance with the reaction formula (5) and then forms the CO gas by the solution loss reaction expressed by the formula (4). On the other hand, the CO gas rising from below is burnt by the reaction of the formula (2) at the secondly tuyere portion positioned above the primary tuyere portion. The iron source is pre-heated by utilizing this exothermic reaction to accomplish high ηco and to reduce the fuel rate. According to the experiments, the ηco improvement of more than 15% can be attained under the condition of the secondary blast quantity/primary blast quantity=¼, and the upper stage blasting by using the multi-stage tuyere can be means for controlling ηco inside the furnace.

However, the solution loss reaction expressed by the formula (4) occurs at the secondary tuyere portion, too, and it is the charge divided charging method in the radial direction that reduces the ratio of this solution loss reaction as much as possible and enables the furnace operation without lowering gas utilization ratio of the vertical furnace even when the small particle solid fuel is used.

This charging method is the one that makes the charging quantity of the iron source and the solid fuel different on the furnace center side and on the furnace peripheral side. In the case of the method which increases the weight ratio of the iron source/solid fuel at the center of the furnace, that is, decreases the weight ratio of the iron source/solid fuel on the peripheral side of the furnace and charges large quantities of the small particle solid fuel on the peripheral side, for example, the gas flow can be directed to the center because the fine particle coke having a large blast resistance is used on the furnace peripheral side, and the rate of the solution loss reaction of the coke on the furnace peripheral side can be restricted because the temperature is lower than at the furnace center due also to the influences of cooling by water sprayed to the furnace body. The gas quantity is great at the furnace center but because the charge quantity of the coke is small, the solution loss reaction of the formula (4) can be much more restricted than in the ordinary mixture charging method or the laminar charging method. In this way, the divided charging method of the charge in the radial direction is effective means for controlling ηco without lowering the combustion efficiency of the vertical furnace even when the small particle solid fuel is used.

Next, the fact that the reduction/melting method of the iron source employing the divided charging method in the radial direction is effective for stabilizing the operation at a low fuel rate and can conduct efficient operation irrespective of the kind of the iron sources and their particle sizes, and the operation method directed to efficient operation, will be explained.

As to the divided charging method in the radial direction, there is an appropriate charging method depending on the kind of the iron source. One of such examples is a divided charging method which is directed to an efficient operation and depends on M.Fe/T.Fe of the iron source, and another is a divided charging method depending on the particle size of the iron source.

First, the reason why the divided charging method depending on the metallization ratio (M.Fe/T.Fe) of the iron source contributes to the stable operation and can provide an efficient operation will be explained.

When the iron source used for reduction/melting is several kinds of iron sources and can be classified in accordance with the ratio M.Fe/T.Fe, the iron sources having a high metallization ratio such as pig iron (mold pig iron), iron scrap, casting scrap, reduced iron, HBI, DRI, etc, are charged into the furnace center, and iron sources having a low metallization ratio (dust lump ore, self-reducible ore, partially oxidized reduced iron, pellet, etc) are charged into the furnace peripheral portion. This is the method which provides the melting function to the furnace center portion and the reducing function to the furnace peripheral portion. The reason why the iron source having a high metallization ratio to the furnace center portion and the iron source having a low metallization ratio to the furnace peripheral portion is to easily control the height of the coke bed at the furnace center, to secure the central gas flow, and to accomplish the low fuel rate operation.

When this operation is contemplated, the secondary tuyere has the structure wherein the distal end of the tuyere protrudes much more into the furnace than the furnace wall, and it is fundamentally ideal to dispose the position of the distal end of the secondary tuyere at the boundary between the furnace center and the furnace peripheral portion. When the gas flow is the center flow and the reducing function of the iron source charged into the furnace peripheral portion is of importance, the solid fuel at the peripheral portion preferably consists of the small particle fuel, and the solid fuel at the center preferably consists of the large particle fuel.

The reason why the secondary tuyere is set at the boundary between the center and the peripheral portion of the furnace is to prevent the secondary blast from being used for the combustion of the solid fuel existing at the peripheral portion, and the secondary blast is directed to the CO gas combustion expressed by the formula (2). Since the furnace center portion is mainly directed to the melting function, it is most efficient to direct the operation of $\eta co>90\%$ at the furnace center, and the solid fuel at the furnace center can be reduced to the content for carburization at the lowest fuel rate. Therefore, the drastic change of the height of the coke bed can be restricted and moreover, because the coke keeping the particle diameter serves as the coke bed, the low fuel rate operation securing the gas- and liquid-permeability can be carried out.

In this operation, a suitable secondary blast quantity is determined depending on the height of the coke bed. As described above, the height of the coke bed varies depending on the coke particle size and the gas flow velocity inside the furnace, etc, but when the upper end of the coke bed is set to the optimum position ($\eta co>90\%$), secondary blast becomes unnecessary. When $\eta co$ of the upper end position of the coke bed is not greater than 90%, $\eta co>90\%$ can be set by secondary blast, and the ideal operation can be carried out for the furnace center portion.

As to the coke at the furnace center, the efficient operation can be contemplated, in principle, by setting the height of the coke bed to a lower level than when the large diameter coke is used, or by adjusting the blast volume, without changing $\eta co$ even when the fine particle coke is used, as shown in FIGS. 4(a)–4(c).

Since the iron source is molten at the upper end position of the coke bed, the optimum position of the height of the coke bed in the melting operation of the iron scrap, etc, is preferably set to the position at which the gas temperature reaches the highest level, that is, the position in the proximity of $\eta co=100\%$ at $O_2=0\%$.

In the test operation of the vertical furnace at the secondary blast volume/primary blast volume of ¼, the $\eta co$ improvement of more than 15% can be attained by blasting described above, and when this experimental result is taken into consideration, it is preferred to set the coke bed to the height which satisfies $\eta co>65\%$ at at least the upper end position of the coke bed if the operation of $\eta co>80\%$ is contemplated.

At the peripheral portion into which the iron source having a low mean metallization ratio is charged, on the other hand, reduction must be conducted at the position higher than the upper end portion of the coke bed, it is necessary to control $\eta co$ of the upper end portion of the coke bed by setting the portion of $\eta co=100$ at $O_2=0$ as the lower limit position and to set the height of the coke bed at a higher position in accordance with the kind of the iron source, M.Fe/T.Fe, and so forth.

The height of the coke bed is set in advance to a predetermined position before the start of the operation. The height of the coke bed can be maintained during the operation by charging from the top of the furnace the coke in the quantity corresponding to the coke consumption quantity inside the furnace.

When the operation of $\eta co>65\%$ at the upper end portion of the coke bed is contemplated by using a large diameter coke of 80 mm at a gas flow velocity of 1 Nm/s inside the furnace, the suitable level of the height of the coke bed is within the distance of 60 to 90 cm from the lower stage tuyere as can be seen from FIGS. 4(a)–4(c). When the operation of $\eta co<30\%$ at the upper end portion of the coke bed is contemplated, a suitable level of the height of the coke bed is within the distance of more than 130 cm in 80 mm large coke and more than 120 cm in 30 mm blast furnace coke, from the lower stage tuyere.

Next, the reasons why the charging method which mixes the iron source with the solid fuel when charging the iron source having a low metallization ratio into the furnace peripheral portion is efficient will be explained.

Figure 6A:
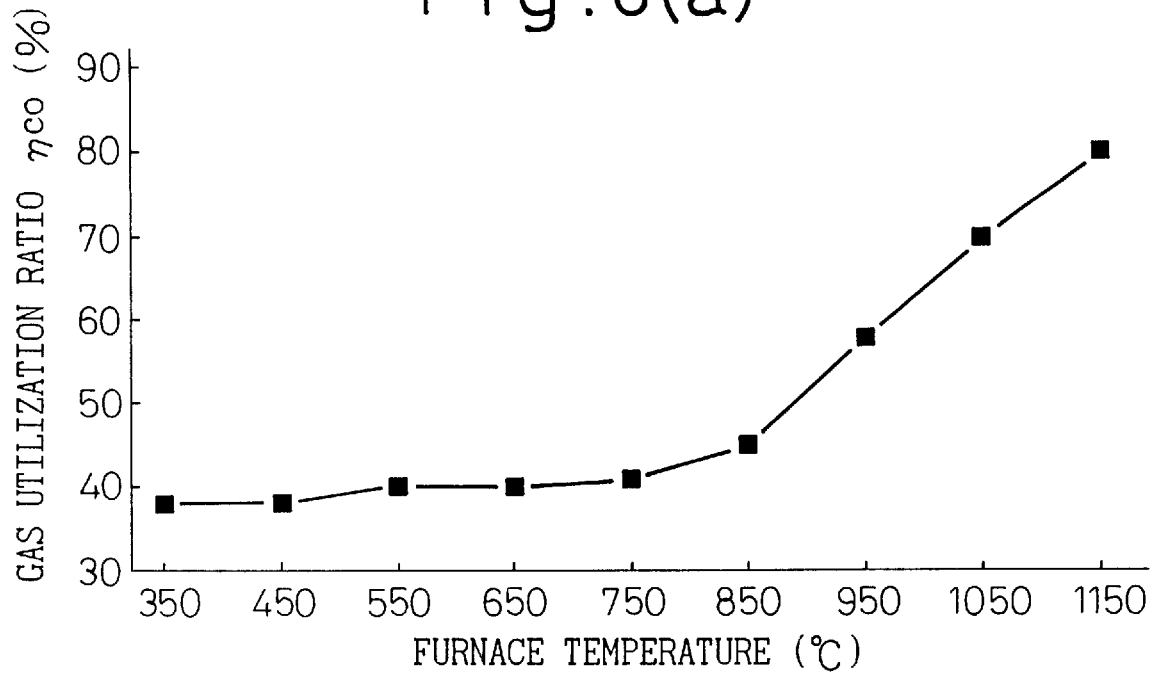
FIG. 6(a) shows a view illustrating the relationship between a furnace temperature and ηco when a dust containing iron (self-reducible lump ore) is mixed with coke.
Figure 6B:
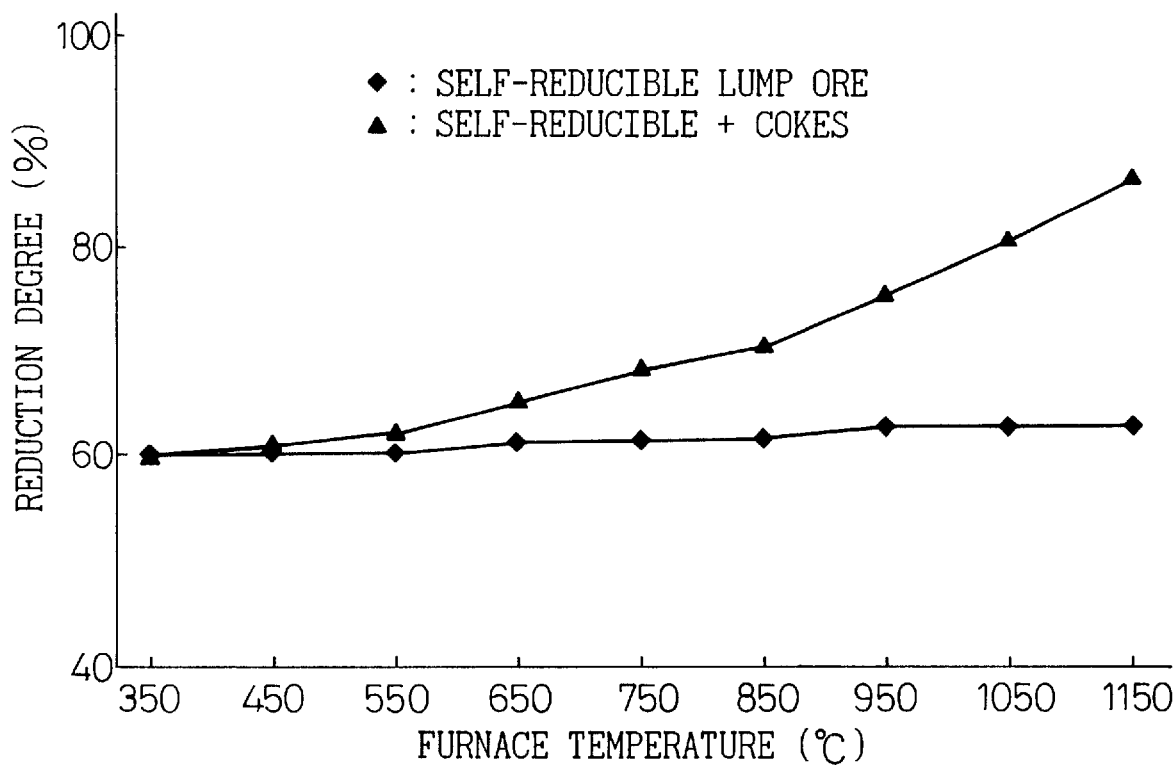
FIG. 6(b) shows a view illustrating the relationship between a furnace temperature and reduction degree depending on the existence/absence of a mixed coke.

If the operation having high $\eta co$ is attained, the operation at a low fuel rate becomes possible. When the experiment for reducing the iron source having a low metallization ratio under the condition of $\eta co>30\%$ is carried out, it has been found out that when the iron source is not mixed with the coke, the reducing reaction from wustite in the iron source to iron does not proceed when the coke is not mixed, and melting/reduction which exerts adverse influences on the operation occurs at the high temperature portion. In contrast, the examination result of the off-line simulator reveals that the reduction degree improvement effect of at least 20% can be attained even in the case of the iron source having a low metallization ratio by mixing it with the coke and charging the mixture, in comparison with the case where the iron source is not mixed with the coke, as demonstrated in FIG. 6(b).

The fact given above demonstrates that in the operation for charging the iron source having a low metallization ratio, the charging method which mixes the iron source with the solid fuel (coke) provides a higher reducing effect of the iron source than the operation method which does not mix it with the solid fuel (coke), and as a result, the slag melting quantity at the time of melting can be reduced, and so-called "shelving" can be avoided, too.

As a method of promoting the reduction of the iron source having a low metallization ratio to be charged into the furnace peripheral portion and to improve the reduction degree of the iron source before melting, it is effective to add C into the iron-containing dust and to increase the C content. The upper limit of the C content to be added is about 20% from the limitation of the strength.

Figure 3:
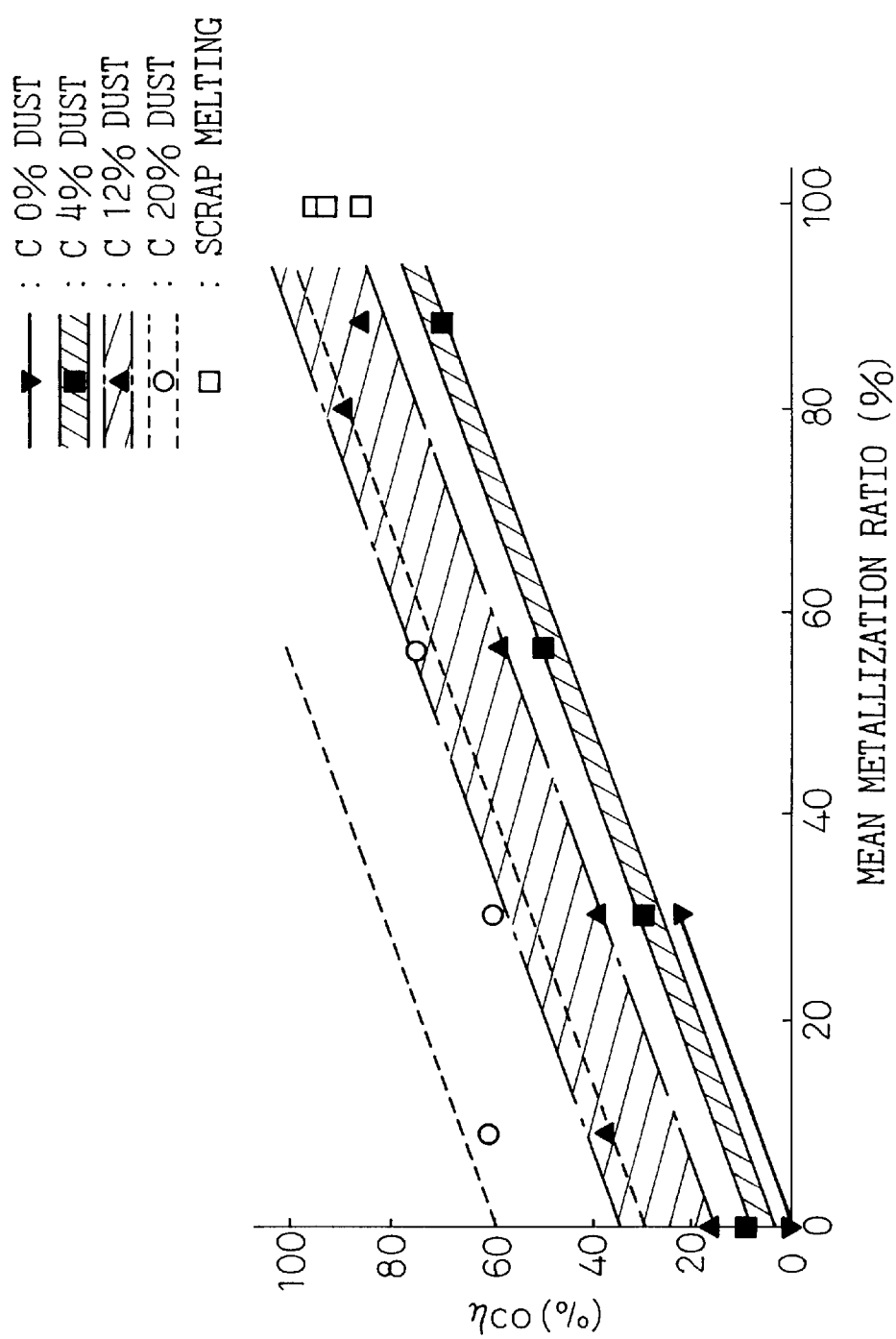
FIG. 3 shows a view illustrating the relationship a mean metallization ratio of an iron source and ηco level at which reduction and melt of the iron source can be carried out without problem.

FIG. 3 shows an example of the examination result of the relation between the mean metallization ratio of the iron source and the $\eta co$ level at which reduction/melting of the iron source can be smoothly carried out. Though the $\eta co$ level somewhat varies depending on the C content added to the iron-contain dust, the operable $\eta co$ level can be judged from the mean metallization ratio of the iron source charged.

The coke is generally used as the solid fuel, but charcoal materials such as the anthracite coal can be also used.

Next, FIGS. 7(a) to (d) show typical examples of the charging methods for charging the dust lump ore, the self-reducible lump ore, the lump reduced iron (HBI, DRI), the iron scrap, the casting scrap, the pig iron (mold pig iron), the ores, pellets, reduced iron powder, etc. These methods in FIGS. 7(a) and 7(b) charge the iron source having a high metallization ratio, that is, the pig iron, the iron scrap and the lump reduced iron, and the large particle coke for supplementing the coke bed and for carburization, into the furnace center portion, and charges the iron source having a low metallization ratio (dust lump ore, the self-reducible lump ore, partially oxidized reduced iron, pellet) in mixture with the small diameter coke into the furnace peripheral portion. They contemplate an operation having high combustion efficiency at a low fuel rate, and is most efficient. Incidentally, as to the partially oxidized lump reduced ore, it can be charged into the furnace center portion as also shown in FIG. 7(c).

In the case where large quantities of reduced iron powder having a particle size of −5 mm are charged from the furnace top, for example, the operation is directed to improve the iron production ratio at the sacrifice of reaction efficiency inside the furnace to a certain extent. For example, it may be possible to mix reduced iron powder and the fine particle solid fuel and to charge the mixture into the furnace peripheral side, and to charge the iron sources having a low metallization ratio such as dust lump ores having a large particle size, the self-reducible ore lump, etc, into the furnace center side. In this case, the solid fuel necessary for the reduction must be charged into the furnace center side, and there can be obtained the advantage that large quantities of the fine particle iron sources can be used, though the reaction rate inside the furnace is inferior to some extents.

In this way, the operation having multiple functions can be carried out in accordance with the kind and properties of the iron sources by employing the divided charging method in the radial direction.

Next, the explanation will be given why the change of the stock line in accordance with the charging portion of the raw material and fuel to be charged in the radial direction of the vertical furnace is effective.

For example, when the iron scrap, the pig iron, the casting scrap, etc, not requiring the reduction are charged into the furnace center portion, the $\eta co$ value is preferably as high as possible. When $\eta co>$ at least 70% is the target, a suitable stock level is (charging height H from the primary tuyere)/(hearth diameter D)<2.0. When the dust lump ore, the self-reducible lump ore and reduced iron requiring the reduction are reduced and molten, it is necessary to lower $\eta co$. If $\eta co=50\%$ is the target in this case, for example, the stock level may be set to H/D=about 2.4. In this way, an appropriate value of the stock level exists in the radial direction in accordance with the kind of the iron sources charged.

Next, a control method for keeping the coke bed height will be described.

The reasons why it is difficult to control the height of the coke bed are as follows. First, the coke bed exists at the lower center portion of the furnace. Unless the coke rate is appropriate, the unreduced FeO content is melted and reduced at the lower part of the furnace and consumes the coke bed, so that abnormal consumption of the coke bed occurs. When such abnormal consumption of the coke occurs particularly at the lower center portion of the furnace, the problem occurs in melting of the iron source, and there is the possibility of the stop of the operation due to the solidification of the slag, and so forth.

Therefore, the iron source having a high metallization ratio, that is, the mold pig iron, the iron scrap, the casting scrap, or the like, is mainly charged into the furnace center portion as described above so that the operation in which melting/reduction difficulty occurs at the furnace center portion is carried out and abnormal consumption of the coke bed at the furnace center is restricted.

In order to reduce as much as possible the solution loss reaction of the coke, the solid fuel charged into the furnace center portion is distinguished from the solid fuel charged into the furnace peripheral portion, and the large diameter coke is used. In consequence, abnormal consumption of the coke bed at the furnace center portion can be restricted, and the operation having high gas utilization ratio $\eta co$ at the furnace lower portion can be carried out.

The position of installation of the upper stage tuyere is appropriately selected in accordance with various dimensions such as the coke particle size, the blast volume, etc., but fundamentally, the $\eta co$ level at the secondary tuyere portion of 65%<$\eta co$<90% is one scale.

The upper end position of the coke bed varies in accordance with the kind of the iron source charged, and as to the charging portion of the iron source not requiring the reducing function, the upper end position is controlled below the secondary tuyere so as to reduce as much as possible the coke combustion. At the charging portion of the iron source requiring the reducing function, on the other hand, the upper end position of the coke bed preferably exists above the secondary tuyere. For, $\eta co$ at the upper end position of the coke bed must be controlled in accordance with the proportion of M.Fe/T.Fe of the iron source.

A simple method for controlling or monitoring the coke bed height is the inspection of the secondary tuyere portion with eye and judgement by a pressure loss value inside the furnace. The inspection at the secondary tuyere portion can judge at least whether the melting portion exists above or below the secondary tuyere. The upper end position of the coke bed can be confirmed by detecting the pressure loss difference between the primary tuyere and the secondary tuyere. According to the operation examples, the pressure loss difference between the primary tuyere and the secondary tuyere can be greatly detected when the coke bed upper end portion exists below the secondary tuyere. For, the existence of the melting portion increases the pressure loss value.

The height of the coke bed can be accurately measured by measuring the lowering behavior of a vertical probe inserted from the upper part of the furnace or that of an iron wire. In the case of the vertical probe, the portion at which the internal furnace temperature drastically rises and reaches at least 1,200° C. corresponds to the upper end portion of the coke bed, and in the case of the iron wire, the portion at which the descending speed stops corresponds to the upper end portion of the coke bed.

Next, the reasons why charging of the iron source having a lower metallization ratio as a mixture with the solid fuel into the furnace peripheral portion, the use of the small particle coke as the coke to be charged into the furnace peripheral portion, and the charging method which changes the iron source/solid fuel ratio in the radial direction are effective for avoiding so-called "shelving" will be explained.

Generally, when large quantities of iron-containing dusts are used, adhesions are likely to be formed on the furnace wall. For example, the reducing reaction becomes slow and as a result, slags containing large quantities of FeO are formed. The slags are then cooled by melting/reduction as the endothermic reaction and adhere to the furnace wall. In another case, large quantities of FeO-containing slags enter the flooding state at the lower part of the furnace, and are blown up and adhere to the furnace wall. In still another case, the unreduced FeO is molten at the upper part of the furnace by the ascending high temperature gas, couples, or is fused, with the adjacent iron source and adheres to the furnace wall. In all of these cases, large quantities of slag molten solutions are generated in the proximity of the furnace wall, adhere to the furnace wall and turn into the adhesion, resulting thereby in so-called "shelving".

In order to avoid this shelving, it is therefore necessary to reduce the molten formation quantity at the furnace peripheral portion, and to prevent the adjacent iron sources from coming into contact with each other as much as possible.

To reduce the molten formation quantity at the furnace peripheral portion, the reduction degree of the iron source must be improved and to this end, it is effective to mix the iron source, which is to be charged into the furnace peripheral portion, with the solid fuel, and to charge the mixture. The particle size of the solid fuel at this time is preferably small. For, if the same weight of the coke is charged, the number of particles charged is greater in the solid fuel having a smaller particles size, and the mutual contact of the iron source can be sufficiently avoided. Incidentally, the term "small particle solid fuel" hereby used means, for example, the coke for the blast furnace (having a particle size of not more than 60 mm), and a small lump coke for the blast furnace having a particle size of about 30 mm.

It is also effective to charge a greater weight of the solid fuel charged into the furnace peripheral portion than the weight of the solid fuel charged into the furnace center portion. To accomplish this object, the weight ratio of the iron source/solid fuel is divided between the furnace center portion and the furnace peripheral portion, the iron source having a high metallization ratio is charged into the furnace center portion so as to reduce the weight of the coke to be charged into the center portion, and the quantity of the coke charged into the peripheral portion is increased as much as possible.

The ratio of the solid fuel to be charged into the furnace peripheral portion varies to some extents depending on the metallization ratio of the iron source to be charged, such as the dust lump ore, the self-reducible lump ore, the reduced iron, and so forth. In the case where 75% of the self-reducible lump ore containing 12% of C, 15% of reduced iron and 10% of iron scrap are used, for example, it has been confirmed by the test operation that shelving can be avoided under the condition where the ratio of the iron source other than the iron scarp not requiring the reduction to the solid fuel, that is, (self-reducible ore lump+reduced iron)/solid fuel is not more than 5.

This condition corresponds to the case of (metal M.Fe weight in the charged iron source)/solid fuel <1.24.

When the iron source having a lower metallization ratio is used, the quantity of the solid fuel to be charged into the furnace peripheral portion must be further increased. When the iron source having a high motallization is used, on the contrary, the solid fuel to be charged into the furnace peripheral portion can be reduced.

Next, in the case where the iron source having a low metallization ratio such as the small particle solid fuel, the reduced iron, the self-reducible ore lump, the dust lump ore, etc., and the solid fuel, are charged into the furnace peripheral portion while the iron source having a high metallization ratio such as the iron scrap, the casting scrap, the ping iron, etc., and the solid fuel, are charged into the furnace center, the reason why setting of the weight ratio of C contained in the solid fuel charged into the furnace center portion and Fe contained in the iron source to $0.01 \leq C/Fe \leq 0.05$ is effective will be explained.

When the iron source charged into the furnace center portion is the iron scrap, the casting scrap or the pig iron, the iron sources other than the iron scrap contain C. Therefore, the C content necessary for carburization is supplemented to only the iron scrap, and in addition, the solid fuel may be supplemented in the quantity corresponding to the quantity consumed partly by the combustion of the coke bed. The carburization quantity to the iron scrap inside the furnace is 2 to 4 wt % of the iron scrap. The experimental result reveals that the consumption quantity of the coke bed at the furnace center portion is about 10 kg/t (corresponding to about 0.01 in terms of the proportion).

The greatest charging quantity of the coke is necessary as the iron source to be charged into the furnace center portion when the iron scrap is used. In this case, since C/Fe=0.02 to 0.04 is necessary for carburization, $0.03 \leq C/Fe \leq 0.05$ when the consumption of the coke bed is taken into account, too. The charging quantity of the coke becomes minimal when the casting scrap or the pig iron is charged as the iron source to be charged into the furnace center portion but the iron scrap is not charged. In this case, the coke for carburization is not necessary, and the solid fuel may be charged at a proportion of C/Fe=0.01 corresponding to the consumption quantity of the coke bed at the furnace center portion. Therefore, the charging proportion of the solid fuel and the iron source may be decided by setting the weight ratio of C and Fe contained in the solid fuel charged into the furnace center portion to $0.01 \leq C/Fe \leq 0.05$.

As to the charging method, it has been confirmed that pre-determined charging can be carried out by using an armor in a bell type charging apparatus, for example, changing the weight ratio of the iron source/solid fuel for each charge, and conducting the first charge to the furnace center portion and the second charge to the furnace peripheral portion. When a furnace top open type charging apparatus that is often observed in melting furnaces such as a cupola is used, it is an effective method to dividedly charge the charges into the furnace center portion by the charging apparatus shown in FIGS. 1(a)–(c).

As a method of avoiding so-called shelving irrespective of the metallization ratio of the iron source, there is a method which charges only the solid fuel near to the furnace wall and charges the iron source and the solid fuel as a mixture to the inner side when charging to the furnace peripheral portion is made, as shown in FIG. 7(d), though the charging method becomes somewhat complicated. More concretely, one charging cycle comprises charging of three charges, only the solid fuel is charged near to the wall of the furnace peripheral portion in the first charge, the mixture of iron scrap and the solid fuel is charged into the furnace center portion in the second charge, and the mixture of the iron source and the solid fuel is charged in the third charge. In this way, predetermined charging becomes possible.

The boundary position between the furnace center portion and the furnace peripheral portion in the present invention somewhat moves in the radial direction of the furnace depending on the metallization ratio of the iron source, the particle size of the coke and the proportion of the use of the iron-containing dust.

Once the amounts of the iron source and the solid fuel to be charged into each portion are determined, the boundary position ri between the furnace center portion and the furnace peripheral portion can be determined in accordance with the following formula (6):

$$ri^2 = \frac{(Wm^{(c)}/\rho m^{(c)} + Wc^{(c)}/\rho c^{(c)})}{\{(Wm^{(c)}/\rho m^{(c)} + Wc^{(c)}/\rho c^{(c)}) + (Wm^{(p)}/\rho m^{(p)} + Wc^{(p)}/\rho c^{(p)})\}} \quad (6)$$

where ri: radius of non-dimensional boundary of center portion and peripheral portion (–);
$Wm^{(c)}$: weight of iron source charged into center portion (kg/charge)
$Wc^{(c)}$: weight of solid fuel charged into center portion (kg/charge)
$Wm^{(p)}$: weight of iron source charged into peripheral portion (kg/charge)
$Wc^{(p)}$: weight of solid fuel charged into peripheral portion (kg/charge)
$\rho m^{(c)}$: bulk density of iron source charged into center portion (kg/m$^3$)
$\rho c^{(c)}$: bulk density of solid fuel charged into center portion (kg/m$^3$)
$\rho m^{(p)}$: bulk density of iron source charged into peripheral portion (kg/m$^3$)
$\rho c^{(p)}$: bulk density of solid fuel charged into peripheral portion (kg/m$^3$)

By the way, this ri is expressed by the non-dimensional radius, and represents the boundary position when the descending speed of the charge is constant at the furnace center portion and at the furnace peripheral portion.

Various method may be possible as the charging method for adjusting the boundary position expressed by this ri value. When the bell type charging apparatus is used, too, the predetermined boundary can be set by using the armor and carrying out alternately and repeatedly the charging operation to the furnace center portion and to the furnace peripheral portion for each charge, although a mixture layer is partly formed.

EXAMPLES

Hereinafter, the features of the present invention will be explained more concretely with reference to Examples thereof.

The following Examples used a furnace top open type vertical furnace having a movable layer type two-stage tuyere structure wherein a hearth diameter was 1.4 m, the number of primary tuyers was 6, the number of secondary tuyere was 6 and the upper limit position of the stock level existed at a position 5.0 m above the primary tuyere. A charging apparatus was of the type that could divide the charging position in the radial direction of the furnace.

By the way, the furnace top exhaust gas composition was defined by the following formula:

$$\eta co^{(TOP)}=(CO_2^{(TOP)}/(CO^{(TOP)}+CO_2^{(TOP)}))$$

Among the operation dimensions, the blast moisture was set to 15 g/Nm$^3$ as the atmospheric moisture, and the original unit of the limestone charged from the furnace top was set to slag basicity=1.0 as the target.

The iron sources to be charged were a self-reducible ore lump containing C (4–20%) (produced by mixing a secondary ash of a blast furnace and coke powder to reduced iron powder having a size of not greater than 3 mm and a particle size of 40 mm×20 mm×30 mm), a dust lump ore obtained by mixing the secondary ash of a blast furnace as a principal component and a dust inside an iron mill and lumping the mixture, a commercially available iron scrap, and reduced iron powder having a particle size of 3 to 5 mm and 5 mm or more.

A small lump coke for a blast furnace, having a particle size of about 30 mm was used as a solid fuel to the furnace peripheral portion, while a large lump coke having a particle size of about 80 mm was used for supplementing carburization at the furnace center portion.

Table 1 shows the detail of the examination results.

Examples 1(a) and 1(b) and Comparative Example 1 represent the operations where the self-reducible lump ore (T.Fe=59.5%, M.Fe/T.Fe 0.19, C 4%): dust lump ore (T.Fe=50.81%, M.Fe/T.Fe=0.057): car shredder scrap iron (T.Fe=90%, M.Fe/T.Fe=0.99): reduced iron lump ore (T.Fe=87%, M.Fe/T.Fe=0.80)=50:10:30:10 in terms of the weight ratio. The mean metallization ratio of the charged iron sources was 56%. In Examples 1(a) and 1(b), the self-reducible lump ore, the dust lump ore, the reduced iron lump ore and the small particle coke were mixed and charged into the peripheral portion, and the car shredder scrap iron and the large lump coke for carburization were charged into the center. In Comparative Example 1, the iron source and the solid fuel described above were completely mixed and charged. However, gas utilization ratio inside the furnace was at a low level of $\eta co$=20% and the hot metal temperature was hanging low, and the slag exhaust was difficult. In contrast, in Examples 1(a) and 1(b) employing the divided charging method, gas utilization ratio $\eta co$ inside the furnace became high, the hot metal temperature rose to about 1,500° C., and the stable operation became possible. In Comparison with Example 1(a), Example 1(b) represents the case where the large lump coke charged into the center portion was partly replaced by the small particle coke, and the operation having higher efficiency could be carried out by changing the level of the coke bed height to the position in the proximity of the position at which the gas combustion temperature reached the highest, that is, to the position 40 cm from the lower stage tuyere.

Example 2 and Comparative Example 2 represent the reduction/melting test examples by using 20 wt % of the dust lump ore and 80 wt % of the car shredder scrap iron. Whereas the raw fuel was completely mixed and charged in Comparative Example 2, the stock level was adjusted in Example 2. Examples 2(b) to 2(d) represent the case where 20 wt % of the dust lump ore and the small particle coke were mixed and changed into the peripheral portion, and 80 wt % of the car shredder scrap iron and the large particle coke for carburization were charged into the center portion. When the large lump coke was partly replaced by the small particle coke in the operation of Example 2(b), Example 2(c) represents the case where the lower stage tuyere was allowed to protrude about 20 cm into the furnace and the tuyere diameter was changed from 50 mm to 40 mm, and Example 2(d) represents the case where blasting was increased so as to elevate the gas flow velocity inside the furnace to 0.8 m/sec. In comparison with Comparative Example, a larger quantity of the small particle coke could be used in Examples of the present invention, and the operation could be carried out more efficiently. These Examples represent that the changes of the stock level and the tuyere structure and optimization of the gas flow velocity inside the furnace were effective.

Example 3 and Comparative Example 3 represent the operations where the self-reducible lump ore (C 12%): dust lump ore (C 4%): car shredder scrap iron: reduced iron powder (T.Fe=87%, M.Fe/T.Fe=0.80)=50:10:30:10. The self-reducible lump ore, the dust lump ore, the reduced iron powder and the small particle coke were mixed and charged into the peripheral portion, and the car shredder scrap iron and the large lump coke for carburization were charged into the center portion. The mean metallization ratio of the charged iron sources was 56%, and the mean metallization ratio of the iron sources charged into the peripheral portion corresponded to 29.6%.

Comparative Example 3 represents the case of the stock level under the normal operation state, that is, the case where the stock level was set to a position 4.2 m above the primary tuyere. Example 3(a) represents the case where the stock level was set to 3.2 m in order to attain $\eta co=55\%$ with reference to the formula (1) and FIG. 3, Example 3(b) represents the case where the stock level was changed in accordance with the metallization ratio on each of the center and peripheral sides with reference to the formula (1) and FIG. 3, Example 3(c) represents the case where the primary blast temperature was the hot blast of 200° C. and oxygen enrichment was 0%, Example 3(d) represents the case where the blasting was only one-stage blast of the hot blast of 550° C., Example 3(e) represents the case where the iron source containing C=20% was used as the self-reducible lump ore and the blast condition was changed, and Example 3(f) represents the case where $\eta co$ was changed with reference to the formula (1) and FIG. 3 when the kind of the charged iron source was changed. In comparison with Comparative Example, the operations could be carried out more satisfactorily in all these Examples, and it was clarified that higher operation efficiency could be accomplished by controlling the stock level in accordance with the iron source in the radial direction and by changing the blast temperature.

Example 4 and Comparative Example 4 represent the cases where 80 wt % of the car shredder scrap iron and 20 wt % of the mold scrap iron were charged with the large lump coke into the center portion whereas the small particle coke was charged into the peripheral portion. Comparative Example represents the case where the stock level was set to 4.2 m, and Example represents the case where the high efficiency operation could be accomplished by changing the stock level.

Example 5 and Comparative Example 5 represent the case where 80 wt % of the car shredder scrap iron and the large lump coke were charged into the center portion whereas 20 wt % of the dust lump ore and the small particle coke were charged into the peripheral portion. The stock level was set to 4.2 m in Comparative Example 5 whereas the high efficiency operation could be accomplished by changing the stock level in Example 5.

Figure 8:
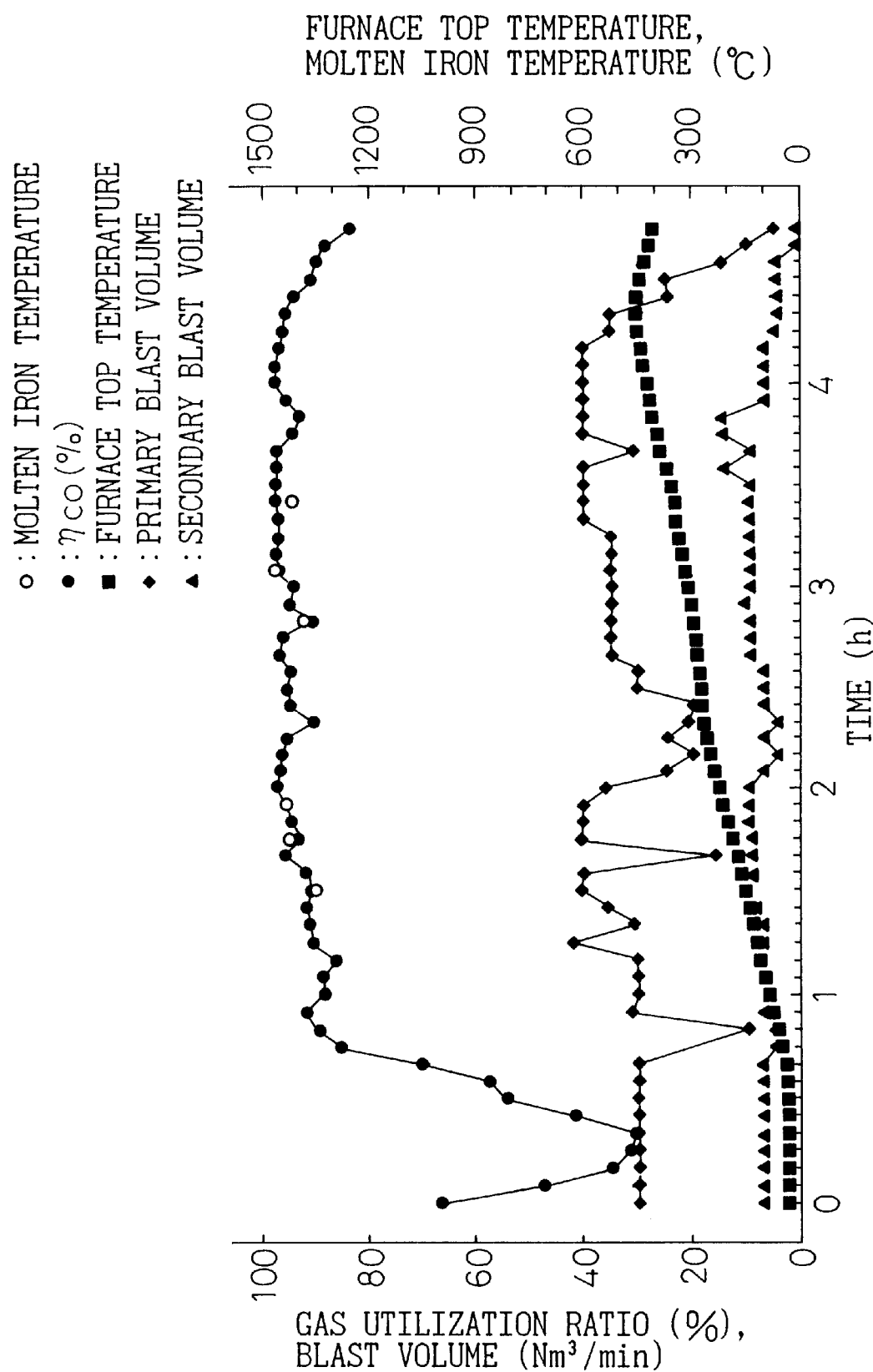
FIG. 8 shows an example of an operation data.

Example 6(b) represents the case where 100 wt % of the car shredder scrap iron and the large lump coke were charged into the center portion whereas the small particle coke was charged into the peripheral portion. Before this Example 6(b) was carried out, the iron source and the coke were completely mixed by an operation similar to the normal cupola operation, the resulting mixture was then charged, and the operation was carried out by setting the coke bed to a height about 1 m above the primary tuyere and the stock level to 4.2 m as in the normal operation (Comparative Example 6). In contrast, though the complete mixture was charged, the operation was carried out by setting the coke bed height to 60 cm above the primary tuyere and the stock level to 3.0 m so as to attain $\eta co=80$ to 90% at the upper end position of the coke bed in consideration that the mean gas flow velocity inside the furnace was 0.7 m/s (Example 6(a)). In Comparative Example 6, the operation could be made only at a low level of $\eta co$ of about 20%, the coke ratio had to be unavoidably raised. In the case of Example 6(a), on the other hand, the operation could be carried out at $\eta co=50\%$ even though large quantities of the small particle coke was used. It has been thus confirmed that the control of the coke bed as well as the stock level was effective. In Example 6(b)A, higher $\eta co$ (>90%) could be accomplished by dividedly charging in the radial direction, and it has been confirmed that the operation with the highest efficiency could be carried out (see FIG. 8).

Example 7 represents the case where the iron scraps were not used but large quantities of fine particle reduced iron powder was used.

To secure gas permeability inside the furnace on the case where 50% of a C-containing dust lump ore containing 7% of C and 50% of reduced iron powder having a particle size of 3 to 5 mm were charged as the iron source, the C-containing dust lump was mixed with the fine particle coke and was charged into the furnace center portion while reduced iron powder was also mixed with the fine particle coke having a particle size of 30 mm and was charged into the peripheral portion. Both of the C-containing dust lump ore and reduced iron powder had a metallization ratio (M.Fe/T.Fe) of 60%. To attain the operation with the target of $\eta co=50\%$, the coke bed was set to a position 1.0 m above the primary tuyere and the stock level was set to a position 3.0 m above the primary tuyere.

Before Example 7 was started, the C-containing dust lump ore and reduced iron powder were completely mixed and the operation was carried out as such without managing the coke bed and the stock level as Comparative Example 7. In this Comparative Example 7, the internal pressure of the furnace exceeded 2,500 mmAq and the continuation of the operation became difficult. In Example 7, on the other hand, the internal pressure shifted at a level of about 1,800 mmAq, and the operation at the initial target value of $\eta co=$approx. 50% could be stably carried out. (FIG. 9)

Industrial Applicability

In the operation method utilizing the novel raw fuel charging method in the pig iron manufacturing method using the iron-containing dust and/or the iron scrap as the principal raw material, the present invention proposes the operation method having higher efficiency, and due to the development of this method, the continuous operation can be carried, combustion efficiency becomes higher, and economical solid fuels having smaller particle sizes can be employed. Accordingly, the operation can be carried out with higher producibility and at a lower fuel cost.

TABLE 1

| | Example | | | | | | | | | | | | | | | | |
|---|---|---|---|---|---|---|---|---|---|---|---|---|---|---|---|---|---|
| | 1(a) | 1(b) | 2(a) | 2(b) | 2(c) | 2(d) | 3(a) | 3(b) | 3(c) | 3(d) | 3(e) | 3(f) | 4 | 5 | 6(a) | 6(b) | 7 |
| charging method | A | A | B | A | A | A | A | A | A | A | A | A | A | A | B | A | A |
| <iron source use ratio> | | | | | | | | | | | | | | | | | |
| self-reducible lump ore (wt %) | 50 | 50 | 0 | 0 | 0 | 0 | 50 | 50 | 50 | 50 | 50 | 0 | 0 | 0 | 0 | 0 | 50 |
| (contained C) (%) | 4 | 4 | | | | | 12 | 12 | 12 | 12 | 20 | | | | | | 7 |
| dust lump ore (C4 %) (wt %) | 10 | 10 | 20 | 20 | 20 | 20 | 10 | 10 | 10 | 10 | 10 | 50 | 0 | 20 | 0 | 0 | 0 |
| car shredder scrap iron (wt %) | 30 | 30 | 80 | 80 | 80 | 80 | 30 | 30 | 30 | 30 | 30 | 40 | 80 | 80 | 100 | 100 | 0 |
| mold pig iron (wt %) | 0 | 0 | 0 | 0 | 0 | 0 | 0 | 0 | 0 | 0 | 0 | 20 | 0 | 0 | 0 | 0 | |
| reduced iron lump (wt %) | 10 | 10 | 0 | 0 | 0 | 0 | 10 | 10 | 10 | 10 | 10 | 0 | 0 | 0 | 0 | 0 | 50 |
| reduced iron powder (wt %) | 0 | 0 | | | | | | | | | | 10 | | | | | 60 |
| mean metallization ratio (%) | 56 | 56 | 87 | 87 | 87 | 87 | 56 | 56 | 56 | 56 | 50 | 70 | 99 | 87 | 99 | 99 | 97 |
| small particle coke (kg/t) | 170 | 170 | 80 | 120 | 120 | 120 | 185 | 170/170 | 172 | 140 | 175 | 80 | 96 | 150 | 110 | 238 | |
| large particle coke (kg/t) | 80 | 50 | 150 | 50 | 45 | 40 | 15 | 15 | 15 | 15 | 15 | 25 | 40 | 40 | 40 | 40 | |
| blast volume (Nm3/min) | | | | | | | | | | | | | | | | | |
| primary blast | 45 | 45 | 40 | 45 | 45 | 54 | 48 | 48 | 48 | 60 | 48 | 48 | 48 | 48 | 30–40 | 30–40 | 40 |
| secondary blast | 11 | 11 | 10 | 11 | 11 | 13 | 12 | 12 | 12 | 0 | 12 | 12 | 12 | 12 | 8–15 | 8–15 | 10 |
| oxygen enrichment ratio (%) | 33 | 3 | 3 | 3 | 3 | 3 | 0 | 0 | 3 | 0 | 5 | 3 | 3 | 3 | 3 | | |
| blast temp. (° C.) | | | | | | | | | | | | | | | | | |
| primary tuyere | 30 | 30 | 30 | 30 | 30 | 30 | 30 | 30 | 200 | 550 | 550 | 550 | 30 | 30 | 36 | 30 | 30 |
| secondary tuyere | 30 | 30 | 30 | 30 | 30 | 30 | 30 | 30 | 30 | | 30 | 30 | 30 | 30 | 30 | 30 | 30 |
| furnace top temp (° C.) | 250 | 200–280 | 280 | 250 | 260 | 180 | 180 | 180 | 185 | 150 | 160 | 180 | 200 | 330 | 300 | 300 | 1460 |
| pig iron temp (° C.) | 1500 | 1500 | 1500 | 1500 | 1510 | 1510 | 1500 | 1500 | 1490 | 1500 | 1460 | 1450 | 1510 | 1505 | 1430 | 1430 | |
| furnace top ηco (%) | 35 | 48 | 50 | 60 | 70–85 | 80 | 50–60 | 60 | 60 | 55–60 | 64–67 | 60 | 92 | 75 | 50 | 95 | 40–60 |

TABLE 1-continued

Comparative Ex.

| | 1 | 2 | 3 | 4 | 5 | 6 | 7 |
|---|---|---|---|---|---|---|---|
| charging method | B | B | A | A | A | B | B |
| <iron source use ratio> | | | | | | | |
| self-reducible lump ore (wt %) | 50 | 0 | 50 | 0 | 0 | 0 | 50 |
| dust lump ore (C4 %) (wt %) (contained C) (%) | 4 | | 12 | | | | 7 |
| car shredder scrap iron (wt %) | 10 | 20 | 10 | 0 | 20 | 0 | 0 |
| mold pig iron (wt %) | 30 | 80 | 30 | 80 | 80 | 100 | 0 |
| reduced iron lump (wt %) | 0 | 0 | 0 | 20 | 0 | 0 | 0 |
| reduced iron powder (wt %) | 10 | 0 | 10 | 0 | 0 | 0 | 0 |
| mean metallization ratio (%) | 56 | 87 | 56 | 99 | 87 | 99 | 50 |
| small particle coke (kg/t) | 30 | 40 | 205 | 105 | 125 | 110 | 60 |
| large particle coke (kg/t) | 280 | 200 | 15 | 50 | 40 | 40 | 250 |
| blast volume (Nm3/min) | | | | | | | 97 |
| primary blast | 40 | 40 | 48 | 48 | 48 | 30–40 | 40 |
| secondary blast | 10 | 10 | 12 | 12 | 12 | 8–15 | 10 |
| oxygen enrichment ratio (%) | 3 | 3 | 3 | 5 | 3 | 3 | 3 |
| blast temp (° C.) | | | | | | | |
| primary tuyere | 30 | 30 | 30 | 30 | 30 | 30 | 30 |
| secondary tuyere | 30 | 30 | 30 | 30 | 30 | 30 | 30 |
| furnace top temp (° C.) | 300 | 300 | 200 | 220 | 250 | 300 | 320 |
| pig iron temp. (° C.) | 1380 | 1460 | 1500 | 1500 | 1502 | 1430 | 1420 |
| furnace top. ηco. (%) | 20 | 30 | 20 | 50 | 50 | 20 | 30–40 |

Example

| | 1(a) | 1(b) | 2(a) | 2(b) | 2(c) | 2(d) | 3(a) | 3(b) | 3(c) | 3(d) | 3(e) | 3(f) | 4 | 5 | 6(a) | 6(b) | 7 |
|---|---|---|---|---|---|---|---|---|---|---|---|---|---|---|---|---|---|
| stock level (m) | | | | | | | | | | | | | | | | | |
| center | 4.2 | 4.2 | 3.4 | 4.2 | 4.2 | 4.2 | 3.2 | 2.5 | 2.5 | 2.5 | 2.5 | 2.5 | 2.5 | 3 | 3 | 3 | 3 |
| peripheral | 4.2 | 4.2 | 3.4 | 4.2 | 4.2 | 4.2 | 3.2 | 3.5 | 3.5 | 3.5 | 3.5 | 3.5 | 2.5 | 3 | 3 | 3 | 3 |
| Coke bedheight (m) | 0.5 | 0.5 → 0.4 | 0.5 | 0.5 | 0.5 | 0.5 | | | | | | | | | | | 1 |
| Coke bed Center height (m) | | | | | | | 0.8 | 0.8 | 0.8 | 0.7 | 0.8 | 0.7 | 0.8 | 0.8 | 0.6 | 0.6 | |
| stability of operation | stable | stable | stock level variation | stable | stable | stable | stable | stable | stable | stable | stable | stable | stable | stable | stable | stable | furnace pressure stable |
| improvement of operation | variation of coke bed height | variation of coke bed height | | | protrusion position, diameter of tuyere | higher flow rate | | | | | | | | | | | |

TABLE 1-continued

| | | | | Comparative Ex. | | | |
|---|---|---|---|---|---|---|---|
| | 1 | 2 | 3 | 4 | 5 | 6 | 7 |
| stock level (m) | | | | | | | |
| center | 4.2 | 4.2 | 4.2 | 4.2 | 4.2 | 4.2 | 3 |
| peripheral | 4.2 | 4.2 | 4.2 | 4.2 | 4.2 | 4.2 | 3 |
| Coke bed height (m) | 0.5 | 0.8 | 0.8 | 0.8 | 0.8 | 1 | 1 |
| Coke bed Center height (m) | | high coke rate | | | | | |
| stability of operation | difficult slag exhaust | | | | | | high furnace pressure |
| improvement of operation | difficult operation | | | | | | difficult operation |

A: dividedly charging in radial direction
B: mixed charging

What is claimed is:

1. An operation method of a vertical furnace with a tuyere provided in a wall surface of the vertical furnace comprising the steps of:

determining mean metallization ratio defined by mean metallic Fe/total Fe of iron sources which require a reduction comprising at least one of dust lump ore, a self-reducible lump ore including carbon containing lump ore, reduced iron having a low metallization ratio inclusive of reduced iron powder, and those which require only a melt consisting essentially of at least one iron source selected from hot briquette reduced iron, reduced iron produced by direct reduction, an iron scrap, a mold pig iron, a return scrap, and setting at least one of a height of coke bed, a position of a stock level, and a tuyere protruding position in accordance with the determined mean metallization ratio, and after said setting step, charging said iron sources and a solid fuel into the vertical furnace to meet with said setting, and reducing and melting the iron sources by blasting an oxygen-containing gas at a temperature from a normal temperature to not higher than 600° C. from the tuyere.

2. An operation method of a vertical furnace according to claim 1, wherein at least two stages of tuyeres are provided in a direction of the furnace height, and a blast ratio of each of said tuyeres disposed in the direction of the height is adjusted in accordance with a particle size of said solid fuel and a mean metallization ratio of said iron source.

3. An operation method of a vertical furnace according to claim 2, when said iron source and solid fuel are charged into a vertical furnace, wherein at least two charges constitute one cycle, and the same charge is repeated in the cycle unit by adjusting at least one of a weight ratio of said iron source/said solid fuel, the kind of said iron source, the kind of said solid fuel, and the particle size of said solid fuel for each charge in each cycle.

4. An operation method of a vertical furnace according to claim 1 further comprising the steps of:

calculating an optimum η CO for reduction in accordance with the determined mean metallization ratio of said iron sources and, setting at least one of the height of coke bed, the position of the stock level, and the tuyere protruding position in accordance with the calculated optimum η CO prior to said charging step.

5. An operation method of a vertical furnace according to claim 4, wherein said optimum η CO is calculated by the formula:

$$1.5 \times C\ \% \leq \eta CO - 0.7 \times (\text{mean M.Fe/T.Fe}) \leq 3.0 \times C\ \%$$

where:

C: C content by percent in iron source, and $0\% \leq C\ \% \leq 20\%$,

η CO: gas utilization ratio in percent, (mean M.Fe/T.Fe): mean metallization ratio in percent.

6. An operation method of a vertical furnace according to claim 5, wherein at least one of the height of coke bed, the position of the stock level, and the tuyere protruding position is adjusted in accordance with a particle size of said solid fuel.

7. An operation method of a vertical furnace according to claim 1, wherein the iron sources having a high metallization ratio and solid fuel are mixed and the resulting mixture is charged into a center position of the vertical furnace, and the iron sources having a low metallization ratio and the solid fuel are mixed and the resulting mixture is charged into a peripheral portion of the vertical furnace.

8. An operation method of a vertical furnace according to claim 7 further comprising the steps of:

calculating an optimum η CO for reduction in accordance with the determined mean metallization ratio of said iron sources and, setting at least one of the height of coke bed, the position of the stock level, and the tuyere protruding position in accordance with the calculated optimum η CO prior to said charging step.

9. An operating method of a vertical furnace according to claim 8, wherein said optimum η CO is calculated by the formula:

$$1.5 \times C\ \% \leq \eta CO - 0.7 \times (\text{mean M.Fe/T.Fe}) \leq 3.0 \times C\ \%$$

where:

C: C content by percent in iron source, and $0\% \leq C\ \% \leq 20\%$,

η CO: gas utilization ratio in percent, (mean M.Fe/T.Fe): mean metallization ratio in percent.

* * * * *